(12) United States Patent
Taylor et al.

(10) Patent No.: US 7,490,007 B2
(45) Date of Patent: *Feb. 10, 2009

(54) VIDEO MIRROR SYSTEM FOR A VEHICLE

(75) Inventors: David W. Taylor, Fenton, MI (US);
Kevin C. McCarthy, Tucson, AZ (US);
Niall R. Lynam, Holland, MI (US);
Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/624,381

(22) Filed: Jan. 18, 2007

(65) Prior Publication Data

US 2008/0201075 A1 Aug. 21, 2008

Related U.S. Application Data

(63) Continuation-in-part of application No. 10/755,915, filed on Jan. 13, 2004, which is a continuation of application No. 09/793,002, filed on Feb. 26, 2001, now Pat. No. 6,690,268, application No. 11/624,381, which is a continuation of application No. 10/645,762, filed on Aug. 20, 2003, now Pat. No. 7,167,796, and a continuation-in-part of application No. 10/456,599, filed on Jun. 6, 2003, now Pat. No. 7,004,593, and a continuation-in-part of application No. 10/287,178, filed on Nov. 4, 2002, now Pat. No. 6,678,614, which is a continuation of application No. 09/799,414, filed on Mar. 5, 2001, now Pat. No. 6,477,464, application No. 11/624,381, which is a continuation-in-part of application No. 10/054,633, filed on Jan. 22, 2002, now Pat. No. 7,195,381, and a continuation-in-part of application No. 09/793,002, filed on Feb. 26, 2001, now Pat. No. 6,690,268.

(60) Provisional application No. 60/406,166, filed on Aug. 27, 2002, provisional application No. 60/405,392, filed on Aug. 23, 2002, provisional application No. 60/404,906, filed on Aug. 21, 2002, provisional application No. 60/346,733, filed on Jan. 7, 2002, provisional application No. 60/315,384, filed on Aug. 28, 2001, provisional application No. 60/271,466, filed on Feb. 26, 2001, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/187,960, filed on Mar. 9, 2000, provisional application No. 60/186,520, filed on Mar. 2, 2000.

(51) Int. Cl.
*G01C 21/00* (2006.01)

(52) U.S. Cl. .................. 701/213; 701/24; 701/207; 701/209; 340/815.4; 340/525

(58) Field of Classification Search ............... 701/200, 701/207–209, 212–213, 23, 24, 25; 345/173; 340/815.4, 425.5, 525, 815.73, 995.28; 359/604, 359/609, 872; 362/494; 348/118, E7.09; 342/357.01, 357.09, 357.13
See application file for complete search history.

(56) References Cited

U.S. PATENT DOCUMENTS

| | | | |
|---|---|---|---|
| 2,166,303 A | 7/1939 | Hodny et al. | |
| 3,185,020 A | 5/1965 | Thelen | 88/1 |
| 3,215,038 A | 11/1965 | Heller et al. | |
| 3,280,701 A | 10/1966 | Donnelly et al. | |
| 3,432,225 A | 3/1969 | Rock | 350/164 |
| 3,451,741 A | 6/1969 | Manos | |
| 3,453,038 A | 7/1969 | Kissa et al. | |
| 3,521,941 A | 7/1970 | Deb et al. | |
| 3,543,018 A | 11/1970 | Barcus et al. | |
| 3,557,265 A | 1/1971 | Chisholm et al. | |
| 3,565,985 A | 2/1971 | Schrenk et al. | |
| 3,628,851 A | 12/1971 | Robertson | |
| 3,652,149 A | 3/1972 | Rogers | |

| | | | | | | |
|---|---|---|---|---|---|---|
| 3,676,668 A | 7/1972 | Collins et al. | | 4,807,096 A | 2/1989 | Skogler et al. |
| 3,692,388 A | 9/1972 | Hall, Jr. et al. | | 4,807,977 A | 2/1989 | Sammells |
| 3,711,176 A | 1/1973 | Alfrey, Jr. et al. | | 4,810,067 A | 3/1989 | Demiryont |
| 3,774,988 A | 11/1973 | Rogers | | 4,832,467 A | 5/1989 | Miyagi et al. |
| 3,781,090 A | 12/1973 | Sumita ................. 350/164 | | 4,855,161 A | 8/1989 | Moser et al. |
| 3,806,229 A | 4/1974 | Schoot et al. | | 4,871,236 A | 10/1989 | Gemma et al. |
| 3,807,832 A | 4/1974 | Castellion | | 4,872,745 A | 10/1989 | Fujisawa et al. |
| 3,821,590 A | 6/1974 | Kosman et al. | | 4,882,466 A | 11/1989 | Friel |
| 3,854,794 A | 12/1974 | Van Dam et al. | | 4,882,565 A | 11/1989 | Gallmeyer ................. 340/461 |
| 3,860,847 A | 1/1975 | Carley | | 4,893,908 A | 1/1990 | Wolf et al. |
| 3,873,185 A | 3/1975 | Rogers | | 4,902,108 A | 2/1990 | Byker |
| 4,035,681 A | 7/1977 | Savage | | 4,908,283 A | 3/1990 | Takahashi et al. |
| 4,075,468 A | 2/1978 | Marcus | | 4,910,591 A | 3/1990 | Petrossian et al. |
| 4,109,235 A | 8/1978 | Bouthors | | 4,927,246 A | 5/1990 | Ito et al. |
| 4,116,545 A | 9/1978 | Reddy | | 4,930,742 A | 6/1990 | Schofield et al. ......... 248/475.1 |
| 4,139,234 A | 2/1979 | Morgan | | 4,935,665 A | 6/1990 | Murata |
| 4,142,783 A | 3/1979 | Engler et al. | | 4,936,533 A | 6/1990 | Adams et al. ............ 248/222.1 |
| 4,174,152 A | 11/1979 | Giglia et al. | | 4,953,305 A | 9/1990 | Van Lente et al. |
| 4,211,955 A | 7/1980 | Ray | | 4,959,247 A | 9/1990 | Moser et al. |
| 4,214,266 A | 7/1980 | Myers | | 4,959,865 A | 9/1990 | Stettiner et al. ................ 381/46 |
| 4,228,490 A | 10/1980 | Thillays | | 4,962,158 A | 10/1990 | Kobayashi et al. |
| 4,257,703 A | 3/1981 | Goodrich | | 4,973,844 A | 11/1990 | O'Farrell ..................... 250/341 |
| 4,277,804 A | 7/1981 | Robison | | 4,993,810 A | 2/1991 | Demiryont |
| 4,281,899 A | 8/1981 | Oskam | | 4,996,083 A | 2/1991 | Moser et al. |
| 4,282,272 A | 8/1981 | Matsuhiro et al. | | 5,005,213 A | 4/1991 | Hanson et al. |
| RE30,835 E | 12/1981 | Giglia | | 5,006,971 A | 4/1991 | Jenkins |
| 4,304,465 A | 12/1981 | Diaz | | 5,014,167 A | 5/1991 | Roberts ..................... 362/83.1 |
| 4,306,768 A | 12/1981 | Egging | | 5,027,200 A | 6/1991 | Petrossian et al. |
| 4,306,774 A | 12/1981 | Nicholson | | 5,028,124 A | 7/1991 | Akhtar |
| 4,310,851 A | 1/1982 | Pierrat | | 5,038,255 A | 8/1991 | Nishihashi et al. |
| 4,331,382 A | 5/1982 | Graff | | 5,042,923 A | 8/1991 | Wolfe et al. |
| 4,338,000 A | 7/1982 | Kamimori et al. | | 5,058,851 A | 10/1991 | Lawlor et al. ................ 248/549 |
| 4,377,613 A | 3/1983 | Gordon | | 5,066,112 A | 11/1991 | Lynam et al. ................ 359/267 |
| 4,419,386 A | 12/1983 | Gordon | | 5,068,062 A | 11/1991 | Inata et al. |
| 4,435,042 A | 3/1984 | Wood et al. ................. 350/281 | | 5,073,012 A | 12/1991 | Lynam ...................... 359/265 |
| 4,435,048 A | 3/1984 | Kamimori et al. | | 5,076,673 A | 12/1991 | Lynam et al. ............... 359/271 |
| 4,436,371 A | 3/1984 | Wood et al. ................. 350/281 | | 5,076,674 A | 12/1991 | Lynam ...................... 359/274 |
| 4,446,171 A | 5/1984 | Thomas ...................... 427/160 | | 5,080,471 A | 1/1992 | Cogan et al. |
| 4,449,786 A | 5/1984 | McCord | | 5,100,095 A | 3/1992 | Haan et al. ................ 248/549 |
| 4,465,339 A | 8/1984 | Baucke et al. | | 5,115,346 A | 5/1992 | Lynam |
| 4,473,695 A | 9/1984 | Wrighton et al. | | 5,117,346 A | 5/1992 | Gard ........................... 363/51 |
| 4,490,227 A | 12/1984 | Bitter | | 5,121,200 A | 6/1992 | Choi et al. |
| 4,519,930 A | 5/1985 | Kakiuchi | | 5,122,896 A | 6/1992 | Mizusaki et al. |
| 4,524,941 A | 6/1985 | Wood et al. ................. 248/544 | | 5,128,799 A | 7/1992 | Byker |
| 4,533,124 A | 8/1985 | Mercatoris | | 5,136,483 A | 8/1992 | Schöniger et al. ............. 362/61 |
| 4,546,551 A | 10/1985 | Franks | | 5,140,455 A | 8/1992 | Varaprasad et al. ......... 359/275 |
| 4,550,982 A | 11/1985 | Hirai | | 5,142,407 A | 8/1992 | Varaprasad et al. ......... 359/276 |
| 4,561,625 A | 12/1985 | Weaver | | 5,148,014 A | 9/1992 | Lynam et al. |
| 4,580,196 A | 4/1986 | Task | | 5,151,816 A | 9/1992 | Varaprasad et al. ......... 359/275 |
| 4,586,792 A | 5/1986 | Yang et al. | | 5,151,824 A | 9/1992 | O'Farrell |
| 4,588,267 A | 5/1986 | Pastore | | 5,160,200 A | 11/1992 | Cheselske |
| 4,613,211 A | 9/1986 | Papir et al. | | 5,160,201 A | 11/1992 | Wrobel |
| 4,630,904 A | 12/1986 | Pastore | | 5,178,448 A | 1/1993 | Adams et al. ............... 362/83.1 |
| 4,638,287 A | 1/1987 | Umebayashi et al. | | 5,179,471 A | 1/1993 | Caskey et al. |
| 4,646,210 A | 2/1987 | Skogler et al. ............... 362/142 | | 5,189,537 A | 2/1993 | O'Farrell |
| 4,652,090 A | 3/1987 | Uchikawa et al. | | 5,193,029 A | 3/1993 | Schofield et al. ............ 359/604 |
| 4,665,430 A | 5/1987 | Hiroyasu | | 5,197,562 A | 3/1993 | Kakinami et al. |
| 4,671,619 A | 6/1987 | Kamimori et al. | | 5,202,787 A | 4/1993 | Byker et al. |
| 4,692,798 A | 9/1987 | Seko et al. | | 5,207,492 A | 5/1993 | Roberts ...................... 362/30 |
| 4,702,566 A | 10/1987 | Takude et al. | | 5,230,400 A | 7/1993 | Kakinami et al. |
| 4,712,879 A | 12/1987 | Lynam et al. ................ 350/357 | | 5,233,461 A | 8/1993 | Dornan et al. |
| 4,729,076 A | 3/1988 | Masami et al. | | 5,239,405 A | 8/1993 | Varaprasad et al. |
| 4,733,335 A | 3/1988 | Serizawa et al. | | 5,239,406 A | 8/1993 | Lynam et al. |
| 4,733,336 A | 3/1988 | Skogler et al. ............... 362/142 | | 5,243,417 A | 9/1993 | Pollard |
| 4,740,838 A | 4/1988 | Mase et al. | | 5,252,354 A | 10/1993 | Cronin et al. |
| 4,741,603 A | 5/1988 | Miyagi et al. | | 5,253,109 A | 10/1993 | O'Farrell et al. ............. 359/604 |
| 4,750,817 A | 6/1988 | Sammells | | 5,255,442 A | 10/1993 | Schierbeek et al. |
| 4,761,061 A | 8/1988 | Nishiyama et al. | | 5,277,986 A | 1/1994 | Cronin et al. |
| 4,780,752 A | 10/1988 | Angerstein et al. | | 5,278,693 A | 1/1994 | Theiste et al. |
| 4,781,436 A | 11/1988 | Armbruster ................. 350/281 | | 5,280,380 A | 1/1994 | Byker |
| 4,793,690 A | 12/1988 | Gahan et al. ................. 350/279 | | 5,282,077 A | 1/1994 | Byker |
| 4,793,695 A | 12/1988 | Wada et al. | | 5,285,060 A | 2/1994 | Larson et al. ................ 250/214 |
| 4,795,242 A | 1/1989 | Fred et al. | | 5,289,321 A | 2/1994 | Secor |

| | | | | | |
|---|---|---|---|---|---|
| 5,296,924 A | 3/1994 | Blancard et al. | 5,708,410 A | 1/1998 | Blank et al. ................. 340/438 |
| 5,303,205 A | 4/1994 | Gauthier et al. | 5,708,857 A | 1/1998 | Ishibashi |
| 5,304,980 A | 4/1994 | Maekawa | 5,715,093 A | 2/1998 | Schierbeek et al. ......... 359/601 |
| 5,330,149 A | 7/1994 | Haan et al. ................... 248/549 | 5,724,187 A | 3/1998 | Varaprasad et al. ......... 359/608 |
| 5,355,284 A | 10/1994 | Roberts | 5,724,316 A | 3/1998 | Brunts |
| 5,361,190 A | 11/1994 | Roberts et al. | 5,729,194 A | 3/1998 | Spears et al. |
| 5,371,659 A | 12/1994 | Pastrick et al. | 5,729,379 A | 3/1998 | Allemand et al. |
| 5,386,285 A | 1/1995 | Asayama | 5,737,226 A | 4/1998 | Olson et al. |
| 5,406,414 A | 4/1995 | O'Farrell et al. ............ 359/604 | 5,741,966 A | 4/1998 | Handfield et al. .......... 73/146.5 |
| 5,414,461 A | 5/1995 | Kishi et al. | 5,745,050 A | 4/1998 | Nakagawa |
| 5,416,313 A | 5/1995 | Larson et al. ............... 250/214 | 5,751,211 A | 5/1998 | Shirai et al. |
| 5,416,478 A | 5/1995 | Morinaga | 5,751,489 A | 5/1998 | Caskey et al. ............... 359/603 |
| 5,418,610 A | 5/1995 | Fischer | 5,754,099 A | 5/1998 | Nishimura et al. |
| 5,424,865 A | 6/1995 | Lynam | 5,760,828 A | 6/1998 | Cortes |
| 5,424,952 A | 6/1995 | Asayama | 5,760,962 A | 6/1998 | Schofield et al. ............ 359/604 |
| 5,432,496 A | 7/1995 | Lin | 5,761,094 A | 6/1998 | Olson et al. |
| 5,444,478 A | 8/1995 | LeLong et al. | 5,764,139 A | 6/1998 | Nojima et al. |
| 5,446,576 A | 8/1995 | Lynam et al. ............... 359/267 | 5,765,940 A | 6/1998 | Levy et al. |
| 5,457,218 A | 10/1995 | Cronin et al. | 5,767,793 A | 6/1998 | Agravante et al. |
| 5,469,298 A | 11/1995 | Suman et al. | 5,775,762 A | 7/1998 | Vitito |
| 5,475,494 A | 12/1995 | Nishida et al. | 5,780,160 A | 7/1998 | Allemand et al. |
| 5,481,409 A | 1/1996 | Roberts | 5,786,772 A | 7/1998 | Schofield et al. ............ 340/903 |
| 5,483,453 A | 1/1996 | Uemura et al. | 5,788,357 A | 8/1998 | Muth et al. |
| 5,485,378 A | 1/1996 | Franke et al. | 5,790,973 A | 8/1998 | Blaker et al. |
| 5,487,522 A | 1/1996 | Hook ........................ 248/549 | 5,793,308 A | 8/1998 | Rosinski et al. |
| 5,488,496 A | 1/1996 | Pine | 5,793,420 A | 8/1998 | Schmidt |
| 5,497,305 A | 3/1996 | Pastrick et al. | 5,796,094 A | 8/1998 | Schofield et al. ......... 250/208.1 |
| 5,497,306 A | 3/1996 | Pastrick ..................... 362/83.1 | 5,796,176 A | 8/1998 | Kramer et al. ............. 307/10.1 |
| 5,500,760 A | 3/1996 | Varaprasad et al. | 5,798,575 A | 8/1998 | O'Farrell et al. ........... 307/10.1 |
| 5,515,448 A | 5/1996 | Nishitani | 5,798,688 A | 8/1998 | Schofield ..................... 340/438 |
| 5,521,760 A | 5/1996 | DeYoung et al. ............ 359/601 | 5,802,727 A | 9/1998 | Blank et al. |
| 5,523,811 A | 6/1996 | Wada et al. | 5,803,579 A | 9/1998 | Turnbull et al. ............ 362/83.1 |
| 5,525,264 A | 6/1996 | Cronin et al. ............... 252/583 | 5,805,367 A | 9/1998 | Kanazawa |
| 5,528,474 A | 6/1996 | Roney et al. | 5,806,965 A | 9/1998 | Deese |
| 5,530,240 A | 6/1996 | Larson et al. ............... 250/214 | 5,808,777 A | 9/1998 | Lynam et al. ................ 359/265 |
| 5,530,421 A | 6/1996 | Marshall et al. | 5,813,745 A | 9/1998 | Fant, Jr. et al. ............. 362/83.1 |
| 5,535,056 A | 7/1996 | Caskey et al. ............... 359/603 | 5,820,097 A | 10/1998 | Spooner ...................... 248/549 |
| 5,535,144 A | 7/1996 | Kise | 5,820,245 A | 10/1998 | Desmond et al. ........... 362/83.1 |
| 5,541,590 A | 7/1996 | Nishio | 5,823,654 A | 10/1998 | Pastrick et al. |
| 5,550,677 A | 8/1996 | Schofield et al. ............ 359/604 | 5,844,505 A | 12/1998 | Van Ryzin |
| 5,567,360 A | 10/1996 | Varaprasad et al. ......... 252/583 | 5,850,176 A | 12/1998 | Kinoshita et al. |
| 5,570,127 A | 10/1996 | Schmidt | 5,863,116 A | 1/1999 | Pastrick et al. |
| 5,572,354 A | 11/1996 | Desmond et al. ............ 359/265 | 5,871,275 A | 2/1999 | O'Farrell et al. |
| 5,574,443 A | 11/1996 | Hsieh | 5,877,707 A | 3/1999 | Kowalick |
| 5,576,687 A | 11/1996 | Blank et al. ................. 340/438 | 5,877,897 A | 3/1999 | Schofield et al. ............ 359/604 |
| 5,576,975 A | 11/1996 | Sasaki et al. | 5,878,370 A | 3/1999 | Olson |
| 5,587,236 A | 12/1996 | Agrawal et al. ............. 428/334 | 5,879,074 A | 3/1999 | Pastrick |
| 5,602,542 A | 2/1997 | Widmann et al. | 5,883,739 A | 3/1999 | Ashihara et al. |
| 5,610,756 A | 3/1997 | Lynam et al. ............... 359/267 | 5,899,956 A | 5/1999 | Chan |
| 5,611,966 A | 3/1997 | Varaprasad et al. | 5,904,729 A | 5/1999 | Ruzicka |
| 5,615,023 A | 3/1997 | Yang | 5,910,854 A | 6/1999 | Varaprasad et al. ......... 359/273 |
| 5,615,857 A | 4/1997 | Hook ........................ 248/549 | 5,914,815 A | 6/1999 | Bos ............................. 359/571 |
| 5,617,085 A | 4/1997 | Tsutsumi et al. | 5,924,212 A | 7/1999 | Domanski .................... 33/355 |
| 5,632,092 A | 5/1997 | Blank et al. | 5,929,786 A | 7/1999 | Schofield et al. ............ 340/903 |
| 5,632,551 A | 5/1997 | Roney et al. | 5,938,321 A | 8/1999 | Bos et al. .................... 362/494 |
| 5,634,709 A | 6/1997 | Iwama | 5,940,011 A | 8/1999 | Agravante et al. |
| 5,642,238 A | 6/1997 | Sala | 5,940,120 A | 8/1999 | Frankhouse et al. ........... 348/61 |
| 5,644,851 A | 7/1997 | Blank et al. | 5,949,331 A | 9/1999 | Schofield et al. ............ 340/461 |
| 5,646,614 A | 7/1997 | Abersfelder et al. | 5,956,079 A | 9/1999 | Ridgley |
| 5,649,756 A | 7/1997 | Adams et al. ............... 362/83.1 | 5,956,181 A | 9/1999 | Lin .............................. 359/630 |
| 5,650,765 A | 7/1997 | Park | 5,959,367 A | 9/1999 | O'Farrell et al. ........... 307/10.1 |
| 5,662,375 A | 9/1997 | Adams et al. ............... 296/214 | 5,959,555 A | 9/1999 | Furuta |
| 5,668,663 A | 9/1997 | Varaprasad et al. ......... 359/608 | 5,971,552 A | 10/1999 | O'Farrell et al. ............ 359/871 |
| 5,669,698 A | 9/1997 | Veldman et al. ............ 362/83.1 | 5,975,715 A | 11/1999 | Bauder |
| 5,669,699 A | 9/1997 | Pastrick et al. | 6,000,823 A | 12/1999 | Desmond et al. ............ 362/494 |
| 5,669,704 A | 9/1997 | Pastrick | 6,007,222 A | 12/1999 | Thau |
| 5,669,705 A | 9/1997 | Pastrick et al. | 6,009,359 A | 12/1999 | El-Hakim et al. |
| 5,670,935 A | 9/1997 | Schofield et al. | 6,016,035 A | 1/2000 | Eberspacher et al. |
| 5,671,996 A | 9/1997 | Bos et al. .................... 362/83.1 | 6,023,229 A | 2/2000 | Bugno et al. |
| 5,673,994 A | 10/1997 | Fant, Jr. et al. .............. 362/831 | 6,025,872 A | 2/2000 | Ozaki et al. |
| 5,680,123 A | 10/1997 | Lee | 6,037,689 A | 3/2000 | Bingle et al. |
| 5,680,245 A | 10/1997 | Lynam ........................ 359/265 | 6,045,243 A | 4/2000 | Muth et al. |
| 5,699,044 A | 12/1997 | Van Lente et al. | 6,046,766 A | 4/2000 | Sakata |

| | | |
|---|---|---|
| 6,046,837 A | 4/2000 | Yamamoto |
| 6,060,989 A | 5/2000 | Gehlot |
| 6,061,002 A | 5/2000 | Weber et al. |
| 6,067,111 A | 5/2000 | Hahn et al. |
| 6,072,391 A | 6/2000 | Suzuki et al. |
| 6,074,777 A | 6/2000 | Reimers et al. |
| 6,078,355 A | 6/2000 | Zengel |
| 6,078,865 A | 6/2000 | Koyanagi |
| 6,082,881 A | 7/2000 | Hicks |
| 6,086,229 A | 7/2000 | Pastrick |
| 6,099,155 A | 8/2000 | Pastrick et al. |
| 6,102,559 A | 8/2000 | Nold et al. |
| 6,104,552 A | 8/2000 | Thau et al. ............... 359/726 |
| 6,106,121 A | 8/2000 | Buckley et al. |
| 6,111,498 A | 8/2000 | Jobes et al. |
| 6,115,651 A | 9/2000 | Cruz |
| 6,116,743 A | 9/2000 | Hoek |
| 6,122,597 A | 9/2000 | Saneyoshi et al. |
| 6,124,647 A | 9/2000 | Marcus et al. ............ 307/10.1 |
| 6,124,886 A | 9/2000 | DeLine et al. |
| 6,128,576 A | 10/2000 | Nishimoto et al. |
| 6,132,072 A | 10/2000 | Turnbull et al. |
| 6,139,171 A | 10/2000 | Waldmann |
| 6,140,933 A | 10/2000 | Bugno et al. |
| 6,146,003 A | 11/2000 | Thau |
| 6,149,287 A | 11/2000 | Pastrick et al. |
| 6,150,014 A | 11/2000 | Chu et al. |
| 6,151,065 A | 11/2000 | Steed et al. |
| 6,151,539 A | 11/2000 | Bergholz et al. |
| 6,152,590 A | 11/2000 | Furst et al. |
| 6,154,149 A | 11/2000 | Tychkowski et al. |
| 6,154,306 A | 11/2000 | Varaprasad et al. |
| 6,157,294 A | 12/2000 | Urai et al. |
| 6,166,625 A | 12/2000 | Teowee et al. ............ 340/426 |
| 6,166,628 A | 12/2000 | Andreas |
| 6,166,848 A | 12/2000 | Cammenga et al. |
| 6,167,755 B1 | 1/2001 | Damson et al. |
| 6,169,955 B1 | 1/2001 | Fultz |
| 6,172,600 B1 | 1/2001 | Kakinami et al. |
| 6,172,601 B1 | 1/2001 | Wada et al. |
| 6,173,501 B1 | 1/2001 | Blank et al. |
| 6,175,164 B1 | 1/2001 | O'Farrell et al. |
| 6,175,300 B1 | 1/2001 | Kendrick ................... 340/436 |
| 6,176,602 B1 | 1/2001 | Pastrick et al. |
| 6,178,034 B1 | 1/2001 | Allemand et al. |
| 6,184,781 B1 | 2/2001 | Ramakesavan |
| 6,185,492 B1 | 2/2001 | Kagawa et al. |
| 6,191,704 B1 | 2/2001 | Takenaga et al. |
| 6,199,014 B1 | 3/2001 | Walker et al. |
| 6,200,010 B1 | 3/2001 | Anders |
| 6,217,181 B1 | 4/2001 | Lynam et al. ............... 359/879 |
| 6,218,934 B1 | 4/2001 | Regan |
| 6,222,447 B1 | 4/2001 | Schofield et al. ............ 340/461 |
| 6,222,460 B1 | 4/2001 | DeLine et al. ........... 340/815.4 |
| 6,227,689 B1 | 5/2001 | Miller |
| 6,243,003 B1 | 6/2001 | DeLine et al. ........... 340/425.5 |
| 6,245,262 B1 | 6/2001 | Varaprasad et al. |
| 6,249,214 B1 | 6/2001 | Kashiwazaki |
| 6,250,148 B1 | 6/2001 | Lynam .................. 73/170.17 |
| 6,250,766 B1 | 6/2001 | Strumolo et al. |
| 6,250,783 B1 | 6/2001 | Stidham et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,265,968 B1 | 7/2001 | Betzitza et al. |
| 6,268,803 B1 | 7/2001 | Gunderson et al. |
| 6,269,308 B1 | 7/2001 | Kodaka et al. |
| 6,276,821 B1 | 8/2001 | Pastrick et al. |
| 6,276,822 B1 | 8/2001 | Bedrosian et al. |
| 6,278,377 B1 | 8/2001 | DeLine et al. ........... 340/815.4 |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. ............... 359/603 |
| 6,286,984 B1 | 9/2001 | Berg |
| 6,289,332 B2 | 9/2001 | Menig et al. |
| 6,291,906 B1 | 9/2001 | Marcus et al. ............. 307/10.1 |
| 6,294,989 B1 | 9/2001 | Schofield et al. ............ 340/442 |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,304,173 B2 | 10/2001 | Pala et al. |
| 6,305,807 B1 | 10/2001 | Schierbeek ................. 359/603 |
| 6,310,611 B1 | 10/2001 | Caldwell |
| 6,310,738 B1 | 10/2001 | Chu ........................... 359/883 |
| 6,313,454 B1 | 11/2001 | Bos et al. .................. 250/208.1 |
| 6,317,057 B1 | 11/2001 | Lee |
| 6,317,248 B1 | 11/2001 | Agrawal et al. |
| 6,318,870 B1 | 11/2001 | Spooner et al. |
| 6,320,176 B1 | 11/2001 | Schofield et al. ......... 250/208.1 |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. ................ 250/239 |
| 6,326,900 B2 | 12/2001 | DeLine et al. |
| 6,329,925 B1 | 12/2001 | Skiver et al. ............. 340/815.4 |
| 6,330,511 B2 | 12/2001 | Ogura et al. |
| 6,331,066 B1 | 12/2001 | Desmond et al. ............ 362/494 |
| 6,333,759 B1 | 12/2001 | Mazzilli ..................... 348/148 |
| 6,335,680 B1 | 1/2002 | Matsuoka |
| 6,336,737 B1 | 1/2002 | Thau |
| 6,344,805 B1 | 2/2002 | Yasui et al. |
| 6,348,858 B2 | 2/2002 | Weis et al. |
| 6,353,392 B1 | 3/2002 | Schofield et al. ............ 340/602 |
| 6,356,206 B1 | 3/2002 | Takenaga et al. |
| 6,357,883 B1 | 3/2002 | Strumolo et al. |
| 6,362,548 B1 | 3/2002 | Bingle et al. |
| 6,363,326 B1 | 3/2002 | Scully |
| 6,366,213 B2 | 4/2002 | DeLine et al. ........... 340/815.4 |
| 6,370,329 B1 | 4/2002 | Teuchert ........................ 396/7 |
| 6,371,636 B1 | 4/2002 | Wesson |
| 6,386,742 B1 | 5/2002 | DeLine et al. |
| 6,390,529 B1 | 5/2002 | Bingle et al. |
| 6,390,635 B2 | 5/2002 | Whitehead et al. |
| 6,396,397 B1 | 5/2002 | Bos et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,415,230 B1 | 7/2002 | Maruko et al. |
| 6,416,208 B2 | 7/2002 | Pastrick et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,492 B1 | 7/2002 | Bos et al. |
| 6,427,349 B1 | 8/2002 | Blank et al. |
| 6,428,172 B1 | 8/2002 | Hutzel et al. ................ 359/838 |
| 6,433,676 B2 | 8/2002 | DeLine et al. |
| 6,433,680 B1 | 8/2002 | Ho |
| 6,437,688 B1 | 8/2002 | Kobayashi |
| 6,438,491 B1 | 8/2002 | Farmer |
| 6,439,755 B1 | 8/2002 | Fant et al. |
| 6,441,872 B1 | 8/2002 | Ho |
| 6,445,287 B1 | 9/2002 | Schofield et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,466,701 B1 | 10/2002 | Ejiri et al. |
| 6,472,977 B1 | 10/2002 | Pöchmüller |

| | | | | | | |
|---|---|---|---|---|---|---|
| 6,473,001 B1 | 10/2002 | Blum | | 6,778,904 B2 | 8/2004 | Iwami et al. |
| 6,474,853 B2 | 11/2002 | Pastrick et al. | | 6,810,323 B1 | 10/2004 | Bullock et al. |
| 6,476,731 B1 | 11/2002 | Miki et al. | | 6,824,281 B2 | 11/2004 | Schofield et al. |
| 6,477,460 B2 | 11/2002 | Kepler | | 6,832,848 B2 | 12/2004 | Pastrick |
| 6,477,464 B2 | 11/2002 | McCarthy et al. | | 6,836,725 B2 | 12/2004 | Millington et al. |
| 6,483,429 B1 | 11/2002 | Yasui et al. | | 6,847,487 B2 | 1/2005 | Burgner |
| 6,483,438 B2 | 11/2002 | DeLine et al. | | 6,848,817 B2 | 2/2005 | Bos et al. |
| 6,487,500 B2 | 11/2002 | Lemelson et al. | | 6,855,431 B2 | 2/2005 | Varaprasad et al. |
| 6,494,602 B2 | 12/2002 | Pastrick et al. | | 6,882,287 B2 | 4/2005 | Schofield |
| 6,498,620 B2 | 12/2002 | Schofield et al. | | 6,902,284 B2 | 6/2005 | Hutzel et al. |
| 6,501,387 B2 | 12/2002 | Skiver et al. | | 6,912,396 B2 | 6/2005 | Sziraki et al. |
| 6,513,252 B1 | 2/2003 | Schierbeek et al. | | 6,946,978 B2 | 9/2005 | Schofield |
| 6,515,581 B1 | 2/2003 | Ho | | 7,004,592 B2 | 2/2006 | Varaprasad et al. |
| 6,515,597 B1 | 2/2003 | Wada et al. | | 7,046,448 B2 | 5/2006 | Burgner |
| 6,520,667 B1 | 2/2003 | Mousseau | | 7,167,796 B2 | 1/2007 | Taylor et al. |
| 6,522,451 B1 | 2/2003 | Lynam | | 7,175,291 B1 | 2/2007 | Li |
| 6,522,969 B2 | 2/2003 | Kannonji | | 7,183,332 B2 | 2/2007 | Ferraro et al. |
| 6,539,306 B2 | 3/2003 | Turnbull | | 7,195,381 B2 | 3/2007 | Lynam et al. |
| 6,542,085 B1 | 4/2003 | Yang | | 7,202,987 B2 | 4/2007 | Varaprasad et al. |
| 6,542,182 B1 | 4/2003 | Chutorash | | 7,328,103 B2 | 2/2008 | McCarthy et al. |
| 6,545,598 B1 | 4/2003 | de Villeroche | | 7,344,284 B2 | 3/2008 | Lynam et al. |
| 6,553,308 B1 | 4/2003 | Uhlmann et al. | | 7,370,983 B2 | 5/2008 | DeWind et al. |
| 6,568,839 B1 | 5/2003 | Pastrick et al. | | 2001/0019356 A1 | 9/2001 | Takeda et al. |
| 6,572,233 B1 | 6/2003 | Northman et al. | | 2001/0022616 A1 | 9/2001 | Rademacher et al. |
| 6,575,643 B2 | 6/2003 | Takahashi | | 2001/0026316 A1 | 10/2001 | Senatore |
| 6,580,373 B1 | 6/2003 | Ohashi | | 2001/0045981 A1 | 11/2001 | Gloger et al. |
| 6,581,007 B2 | 6/2003 | Hasegawa et al. | | 2002/0003571 A1 | 1/2002 | Schofield et al. |
| 6,583,730 B2 | 6/2003 | Lang et al. | | 2002/0049535 A1 | 4/2002 | Rigo et al. |
| 6,591,192 B2 | 7/2003 | Okamura et al. | | 2002/0072026 A1 | 6/2002 | Lynam et al. |
| 6,594,583 B2 | 7/2003 | Ogura et al. | | 2002/0093826 A1 | 7/2002 | Bos et al. |
| 6,594,614 B2 | 7/2003 | Studt et al. | | 2002/0126497 A1 | 9/2002 | Pastrick |
| 6,611,202 B2 | 8/2003 | Schofield et al. | | 2002/0154007 A1 | 10/2002 | Yang |
| 6,611,227 B1 | 8/2003 | Nebiyeloul-Kifle | | 2002/0159270 A1 | 10/2002 | Lynam et al. |
| 6,611,759 B2 | 8/2003 | Brosche | | 2002/0172053 A1 | 11/2002 | Pastrick et al. |
| 6,614,387 B1 | 9/2003 | Deadman | | 2002/0191409 A1 | 12/2002 | DeLine et al. |
| 6,616,764 B2 | 9/2003 | Krämer et al. | | 2003/0002165 A1 | 1/2003 | Mathias et al. |
| 6,618,672 B2 | 9/2003 | Sasaki et al. | | 2003/0007261 A1 | 1/2003 | Hutzel et al. |
| 6,627,918 B2 | 9/2003 | Getz et al. | | 2003/0016125 A1 | 1/2003 | Lang et al. |
| 6,630,888 B2 | 10/2003 | Lang et al. | | 2003/0016287 A1 | 1/2003 | Nakayama et al. |
| 6,636,258 B2 | 10/2003 | Strumolo | | 2003/0016543 A1 | 1/2003 | Pastrick et al. |
| 6,642,840 B2 | 11/2003 | Lang et al. | | 2003/0020603 A1 | 1/2003 | DeLine et al. |
| 6,642,851 B2 | 11/2003 | Deline et al. | | 2003/0025596 A1 | 2/2003 | Lang et al. |
| 6,648,477 B2 | 11/2003 | Hutzel et al. | | 2003/0025597 A1 | 2/2003 | Schofield |
| 6,665,592 B2 | 12/2003 | Kodama | | 2003/0030546 A1 | 2/2003 | Tseng |
| 6,670,207 B1 | 12/2003 | Roberts | | 2003/0030551 A1 | 2/2003 | Ho |
| 6,670,910 B2 | 12/2003 | Delcheccolo et al. | | 2003/0030724 A1 | 2/2003 | Okamoto |
| 6,672,744 B2 | 1/2004 | DeLine et al. | | 2003/0035050 A1 | 2/2003 | Mizusawa |
| 6,674,370 B2 | 1/2004 | Rodewald et al. | | 2003/0043269 A1 | 3/2003 | Park |
| 6,675,075 B1 | 1/2004 | Engelsberg et al. | | 2003/0052969 A1 | 3/2003 | Satoh et al. |
| 6,678,614 B2 | 1/2004 | McCarthy et al. | | 2003/0058338 A1 | 3/2003 | Kawauchi et al. |
| 6,683,539 B2 | 1/2004 | Trajkovic et al. | | 2003/0067383 A1 | 4/2003 | Yang |
| 6,683,969 B1 | 1/2004 | Nishigaki et al. | | 2003/0069690 A1 | 4/2003 | Correia et al. |
| 6,685,348 B2 | 2/2004 | Pastrick et al. | | 2003/0076415 A1 | 4/2003 | Strumolo |
| 6,690,268 B2 | 2/2004 | Schofield et al. | | 2003/0080877 A1 | 5/2003 | Takagi et al. |
| 6,690,413 B1 | 2/2004 | Moore | | 2003/0085806 A1 | 5/2003 | Samman et al. |
| 6,693,517 B2 | 2/2004 | McCarthy et al. | | 2003/0088361 A1 | 5/2003 | Sekiguchi |
| 6,693,518 B2 | 2/2004 | Kumata | | 2003/0090568 A1 | 5/2003 | Pico |
| 6,693,519 B2 | 2/2004 | Keirstead | | 2003/0090569 A1 | 5/2003 | Poechmuller |
| 6,693,524 B1 | 2/2004 | Payne | | 2003/0090570 A1 | 5/2003 | Takagi et al. |
| 6,709,136 B2 | 3/2004 | Pastrick et al. | | 2003/0098908 A1 | 5/2003 | Misaiji et al. |
| 6,717,610 B1 | 4/2004 | Bos et al. | | 2003/0103141 A1 | 6/2003 | Bechtel et al. |
| 6,717,712 B2 | 4/2004 | Lynam et al. | | 2003/0103142 A1 | 6/2003 | Hitomi et al. |
| 6,726,337 B2 | 4/2004 | Whitehead et al. | | 2003/0117522 A1 | 6/2003 | Okada |
| 6,727,808 B1 | 4/2004 | Uselmann et al. | | 2003/0122929 A1 | 7/2003 | Minaudo et al. |
| 6,727,844 B1 | 4/2004 | Zimmermann et al. | | 2003/0122930 A1 | 7/2003 | Schofield et al. |
| 6,731,332 B1 | 5/2004 | Yasui et al. | | 2003/0133014 A1 | 7/2003 | Mendoza |
| 6,734,807 B2 | 5/2004 | King | | 2003/0137586 A1 | 7/2003 | Lewellen |
| 6,737,964 B2 | 5/2004 | Samman et al. | | 2003/0141965 A1 | 7/2003 | Gunderson et al. |
| 6,738,088 B1 | 5/2004 | Uskolovsky et al. | | 2003/0146831 A1 | 8/2003 | Berberich et al. |
| 6,744,353 B2 | 6/2004 | Sjönell | | 2003/0169158 A1 | 9/2003 | Paul, Jr. |
| 6,748,211 B1 | 6/2004 | Isaac et al. | | 2003/0169522 A1 | 9/2003 | Schofield et al. |
| 6,756,912 B2 * | 6/2004 | Skiver et al. ............ 340/815.4 | | 2003/0179293 A1 | 9/2003 | Oizumi |
| 6,757,109 B2 | 6/2004 | Bos | | 2003/0202096 A1 | 10/2003 | Kim |

| | | | | | | |
|---|---|---|---|---|---|---|
| 2003/0214576 | A1 | 11/2003 | Koga | GB | 1008411 | 10/1965 |
| 2003/0214584 | A1 | 11/2003 | Ross, Jr. | GB | 1136134 | 12/1968 |
| 2003/0214733 | A1 | 11/2003 | Fujikawa et al. | GB | 2210836 A | 6/1989 |
| 2003/0222793 | A1 | 12/2003 | Tanaka et al. | GB | 2351055 | 12/2000 |
| 2003/0222983 | A1 | 12/2003 | Nobori et al. | JP | 52-10745 | 1/1977 |
| 2003/0227546 | A1 | 12/2003 | Hilborn et al. | JP | 5730639 | 2/1982 |
| 2004/0004541 | A1 | 1/2004 | Hong | JP | 57208530 | 12/1982 |
| 2004/0027695 | A1 | 2/2004 | Lin | JP | 5830729 | 2/1983 |
| 2004/0032321 | A1 | 2/2004 | McMahon et al. | JP | 59-114139 | 7/1984 |
| 2004/0032675 | A1 | 2/2004 | Weller et al. | JP | 59-116623 | 7/1984 |
| 2004/0036768 | A1 | 2/2004 | Green | JP | 63-262624 | 4/1987 |
| 2004/0046870 | A1 | 3/2004 | Leigh Travis | JP | 63-24225 | 2/1988 |
| 2004/0051634 | A1 | 3/2004 | Schofield et al. | JP | 63106730 | 5/1988 |
| 2004/0056955 | A1 | 3/2004 | Berberich et al. | JP | 63106731 | 5/1988 |
| 2004/0057131 | A1 | 3/2004 | Hutzel et al. | JP | 64-14700 | 1/1989 |
| 2004/0064241 | A1 | 4/2004 | Sekiguchi | JP | 1-33535 | 2/1989 |
| 2004/0066285 | A1 | 4/2004 | Sekiguchi | JP | 1-230608 | 9/1989 |
| 2004/0075603 | A1 | 4/2004 | Kodama | JP | 4-114587 | 4/1992 |
| 2004/0077359 | A1 | 4/2004 | Bernas et al. | JP | 5-213113 | 8/1993 |
| 2004/0080404 | A1 | 4/2004 | White | JP | 11078693 | 3/1999 |
| 2004/0080431 | A1 | 4/2004 | White | WO | WO0018612 | 4/2000 |
| 2004/0085196 | A1 | 5/2004 | Miller et al. | WO | WO0055685 A1 | 9/2000 |
| 2004/0090314 | A1 | 5/2004 | Iwamoto | | | |
| 2004/0090317 | A1 | 5/2004 | Rothkop | | | |
| 2004/0096082 | A1 | 5/2004 | Nakai et al. | | | |
| 2004/0098196 | A1 | 5/2004 | Sekiguchi | | | |
| 2004/0107030 | A1 | 6/2004 | Nishira et al. | | | |
| 2004/0107617 | A1 | 6/2004 | Shoen et al. | | | |
| 2004/0109060 | A1 | 6/2004 | Ishii | | | |
| 2004/0114039 | A1 | 6/2004 | Ishikura | | | |
| 2004/0128065 | A1 | 7/2004 | Taylor et al. | | | |
| 2004/0145457 | A1 | 7/2004 | Schofield et al. | | | |
| 2004/0202001 | A1 | 10/2004 | Roberts et al. | | | |
| 2004/0243303 | A1 | 12/2004 | Padmanabhan | | | |
| 2005/0078389 | A1 | 4/2005 | Kulas et al. | | | |
| 2005/0079326 | A1 | 4/2005 | Varaprasad et al. | | | |
| 2005/0083577 | A1 | 4/2005 | Varaprasad et al. | | | |
| 2006/0007550 | A1 | 1/2006 | Tonar et al. | | | |
| 2006/0028730 | A1 | 2/2006 | Varaprasad et al. | | | |
| 2006/0050018 | A1 | 3/2006 | Hutzel et al. | | | |
| 2006/0164230 | A1 | 7/2006 | DeWind et al. | | | |
| 2007/0118287 | A1 | 5/2007 | Taylor et al. | | | |
| 2007/0132567 | A1 | 6/2007 | Schofield et al. | | | |
| 2007/0162229 | A1 | 7/2007 | McCarthy et al. | | | |
| 2007/0171037 | A1 | 7/2007 | Schofield et al. | | | |
| 2007/0183066 | A1 | 8/2007 | Varaprasad et al. | | | |
| 2007/0184284 | A1 | 8/2007 | Varaprasad et al. | | | |
| 2008/0094684 | A1 | 4/2008 | Varaprasad et al. | | | |
| 2008/0094685 | A1 | 4/2008 | Varaprasad et al. | | | |
| 2008/0180529 | A1 | 7/2008 | Taylor et al. | | | |
| 2008/0180781 | A1 | 7/2008 | Varaprasad et al. | | | |
| 2008/0183355 | A1 | 7/2008 | Taylor et al. | | | |
| 2008/0186724 | A1 | 8/2008 | Lynam et al. | | | |
| 2008/0201075 | A1 | 8/2008 | Taylor et al. | | | |
| 2008/0212215 | A1 | 9/2008 | Schofield et al. | | | |

FOREIGN PATENT DOCUMENTS

| | | |
|---|---|---|
| DE | 941408 | 4/1956 |
| DE | 944531 | 7/1956 |
| DE | 7323996 | 11/1973 |
| DE | 2631713 A1 | 2/1977 |
| DE | 3301945 | 7/1984 |
| DE | 3614882 | 11/1987 |
| DE | 29703084 | 6/1997 |
| DE | 29902344 | 7/1999 |
| EP | 0165817 | 12/1985 |
| EP | 0254435 | 5/1992 |
| EP | 531143 | 3/1993 |
| FR | 1021987 | 2/1953 |
| FR | 1461419 | 12/1966 |
| FR | 2 759 045 | 8/1998 |
| GB | 810010 | 3/1959 |

OTHER PUBLICATIONS

Examination Report for European Patent Application No. 01916237.9, filed Jul. 30, 2002.
PCT International Search Report dated Jun. 8, 2002, for PCT application corresponding to the parent U.S. Appl. No. 09/793,002.
Steward, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.
Edgar, Julian; Goodbye 12 Volts . . . Hello 42 Volts!; Oct. 5, 1999; Autospeed 50; Issue 50; www.autospeed.co.nz/cms/A_0319/article.html.
Kobe, Gerry; 42 Volts Goes Underhood; Mar. 2000; Automotive Industries; Cahners Publishing Company; www.findarticles.com/p/articles/mi_m3012/is_3_180/ai_61361677.
Jewett, Dale; Aug. 2000; Automotive Industries; Cahners Publishing Company; www.findarticles.com/p/articles/mi_m3012/is_8_180ai_64341779.
National Semiconductor, LM78S40, Universal Switching Regulator Subsystem, National Semiconductor Corporation, Apr. 1996, p. 6.
PCT International Search Report dated Jun. 8, 2002, for PCT Application corresponding to U.S. Appl. No. 10/054,633.
Dana H. Ballard and Christopher M. Brown, Computer Vision, article, 4 pages Prentice-Hall, Englewood Cliffs, New Jersey, believed to be published more than one year prior to the filing date of the present application.
G. Wang, D. Renshaw, P.B. Denyer and M. Lu, CMOS Video Cameras, article, 1991, 4 pages, University of Edinburgh, UK.
European Supplementary Search Report dated Jan. 23, 2006, 3 pages, received from the European Patent Office in connection with European Patent Application No. 03814216.2.
US 5,148,305, 09/1992, Byker (withdrawn)

\* cited by examiner

*Primary Examiner*—Gertrude Arthur Jeanglaud
(74) *Attorney, Agent, or Firm*—Van Dyke, Gardner, Linn & Burkhart, LLP

(57) ABSTRACT

A video mirror system for a vehicle comprises an interior electrochromic rearview mirror assembly having a reflective element that has a front portion that faces generally towards the driver of the vehicle when the interior rearview mirror assembly is mounted in the vehicle and that has a rear portion that is generally opposite the front portion. The reflective element comprises a transflective mirror reflector that preferably is at least about 15 percent transmitting to visible light incident at the rear portion of the reflective element, and that preferably is at least about 60 percent reflective to visible light incident at the front portion. A video display screen is disposed to the rear of the reflective element and emits light when actuated that passes through the reflective element to be visible to a driver of the vehicle.

25 Claims, 2 Drawing Sheets

VIDEO MIRROR SYSTEM FOR A VEHICLE

CROSS REFERENCE TO RELATED APPLICATIONS

The present application is a continuation of U.S. patent application Ser. No. 10/645,762, filed Aug. 20, 2003, now U.S. Pat. No. 7,167,796, which claims priority of U.S. provisional applications, Ser. No. 60/406,166, filed Aug. 27, 2002 by Taylor et al. for VEHICLE NAVIGATION SYSTEM FOR USE WITH A TELEMATICS SYSTEM; Ser. No. 60/405,392, filed Aug. 23, 2002 by Kevin C. McCarthy for VEHICLE NAVIGATION SYSTEM FOR USE WITH A TELEMATICS SYSTEM; and Ser. No. 60/404,906, filed Aug. 21, 2002 by Taylor for BIOMETRIC VEHICLE SEATING ADJUSTMENT SYSTEM, and which is a continuation-in-part of U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593 issued on Feb. 28, 2006, and which is a continuation-in-part of U.S. patent application Ser. No. 10/287,178, filed Nov. 4, 2002 by McCarthy et al. for NAVIGATION SYSTEM FOR A VEHICLE, now U.S. Pat. No. 6,678,614 issued on Jan. 13, 2004, which is a continuation of U.S. patent application Ser. No. 09/799,414, filed Mar. 5, 2001 by McCarthy et al. for COMPLETE MIRROR-BASED GLOBAL-POSITIONING SYSTEM (GPS) NAVIGATION SOLUTION, now U.S. Pat. No. 6,477,464 issued on Nov. 5, 2002, which claims priority of U.S. provisional application, Ser. No. 60/187,960, filed Mar. 9, 2000 by McCarthy et al., all of which are hereby incorporated herein by reference in their entireties. The present application is also a continuation-in-part of U.S. patent application Ser. No. 10/755,915, filed Jan. 13, 2004 entitled VIDEO MIRROR SYSTEMS INCORPORATING AN ACCESSORY MODULE, which is a continuation of U.S. patent application Ser. No. 09/793,002, filed Feb. 26, 2001, now U.S. Pat. No. 6,690,268 issued on Feb. 10, 2004, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000. The present application is also a continuation-in-part of U.S. patent application Ser. No. 10/054,633, filed Jan. 22, 2002, now U.S. Pat. No. 7,195,381, which claims priority from and incorporates by reference in their entireties U.S. provisional applications, Ser. No. 60/346,733, filed Jan. 7, 2002, entitled IMPROVED VEHICULAR LIGHTING SYSTEM, by Applicants John O. Lindahl and Niall R. Lynam; Ser. No. 60/263,680, filed Jan. 23, 2001; Ser. No. 60/271,466, filed Feb. 26, 2001; and Ser. No. 60/315,384, filed Aug. 28, 2001, and which is a continuation-in-part of U.S. patent application Ser. No. 09/793,002, entitled VIDEO MIRROR SYSTEMS INCORPORATING AN ACCESSORY MODULE, filed Feb. 26, 2001, now U.S. Pat. No. 6,690,268 issued on Feb. 10, 2004.

FIELD OF THE INVENTION

The present invention relates generally to telematics systems for vehicles and, more particularly, to telematics systems which may provide driving instructions or directions to a driver of a vehicle or which may provide other controls to an accessory or system of the vehicle. The present invention also relates generally to vehicle seating adjustment systems and, more particularly, to vehicle seating adjustment systems with memory adjustment.

BACKGROUND OF THE INVENTION

In-vehicle telematics systems or vehicle-based telematics systems, such as General Motor's ONSTAR®, Daimler's TELEAID™, Ford's RESCU® or the like, are common in vehicles today. Such telematics systems involve a telecommunication link from the vehicle to an operator or a voice input system at a service center or the like external to the vehicle. The driver of the vehicle may connect or communicate with an operator at the service center to request directions to a targeted location. The service center may provide directions to the targeted location based on the known position of the vehicle, which may be given to the service center operator by the driver, or which may be known by the operator via a link to a global positioning system (GPS) of the vehicle.

However, in such concierge-type systems, typically all of the road names, exits to take, and directional headings/directions are given verbally by the service center operator to the driver all together while the driver is driving the vehicle. The driver is then typically expected to remember several directional driving instructions and often has difficulty in remembering the full directions. Although the driver may optionally remain on the line with the service center operator until the driver reaches the intended destination, which may take many minutes, such as ten, fifteen, twenty minutes or more, and/or the driver may call back to the service center for updated directions, these actions increase the cost of the service, since the service center typically charges for such calls.

Therefore, there is a need in the art for a navigation system that overcomes the shortcomings of the prior art.

SUMMARY OF THE INVENTION

The present invention is intended to provide instructions or directions to a driver of a vehicle which are keyed or coded or linked to respective geographic locations, such that the particular instructions are provided in response to the geographic position of the vehicle at least generally corresponding to the particular geographic location associated with the particular instruction. The particular instructions are thus provided to the driver of the vehicle only when the geographic position of the vehicle is at or near the predetermined or preset waypoints or geographic locations corresponding to the respective particular instructions.

According to an aspect of the present invention, a navigation system for a vehicle includes a vehicle-based telematics system, a vehicle-based global positioning system and a control. The telematics system is operable to receive a user input and to download directional information from a remote source to the control of the vehicle in response to the user input (often, for instance, in ONSTAR®, the user input may be a request from the driver to the remote source or service center operator for directions to a particular destination) and an initial geographic position of the vehicle, such as typically determined by the vehicle-based global positioning system. The directional information comprises at least two instructions, with each instruction being coded to or associated with or linked to a respective geographic location or waypoint. The control is operable to provide an output corresponding to each of the at least two instructions in response to a then current geographic position of the vehicle. The control is operable to provide each instruction only when the then current geographic position of the vehicle at least generally matches or corresponds to the particular respective geographic location associated with the particular instruction.

For instance, a first instruction is typically downloaded that comprises information as to the initial geographic position and heading of the vehicle (e.g., "You are now heading East on Maple Street. Continue until you reach Oak Road."). A second instruction may then provide information as the vehicle approaches the appropriate turn or intersection or the like to take (e.g., "You are now within two blocks of Oak Road. Prepare to turn Right at Oak Road."). A subsequent instruction may then provide information as to the geographic position of the vehicle after the previous step has been completed (e.g., "You are now heading South on Oak Road. Continue until you reach Elm Street."). The output thus provides separate instructions or steps of the directional information, with each instruction coded to a particular geographic location and provided in response to the then current geographic position of the vehicle.

Also, if the driver of the vehicle does not correctly turn or passes an appropriate turn or the like, the control of the present invention knows this via an input from the in-vehicle or vehicle-based global positioning system. As a consequence, a warning instruction may be communicated to the driver indicating that the directions are not being appropriately followed (e.g., "You have passed Oak Road. Please execute a U-Turn and proceed West on Maple Street to Oak Road and turn Left at Oak Road."). Also, if the driver turns off a given road onto an incorrect road or otherwise strays from the given route, the control may communicate a similar warning or instruction to alert the driver that the vehicle is no longer traveling along the given route (e.g., "You have left Maple Street, but are not on Oak Road. Return to Maple Street and continue East on Maple Street to Oak Road, then turn Right on Oak Road.").

The control is operable to tag or code each of the instructions with a respective geographic location or waypoint (alternately, each of the instructions may be tagged or coded or associated with a respective geographic location or waypoint at the remote source before downloading to the control of the vehicle, without affecting the scope of the present invention). The control is then operable to only display a particular instruction when the geographic location tagged or coded to the particular instruction matches or generally matches the actual, then current geographic position of the vehicle.

The control also receives, preferably continuously, an input from the vehicle-based global positioning system that is indicative of the actual, current geographic position of the vehicle as the vehicle travels along the road, highway or the like. The control is then operable to compare the tagged or coded geographic location (as associated with the respective instructions) with the GPS-derived actual geographic position information. Thus, the control may determine when a particular instruction is appropriate to be displayed and/or communicated to the driver by determining that the GPS-derived actual geographic position of the vehicle is now at or at least close to the geographic location associated with a particular instruction.

The user input may comprise a vocal input from the driver of the vehicle to the remote source or service center, or may comprise a keypad input or the like, without affecting the scope of the present invention. Preferably, the geographic position of the vehicle is provided to the remote source (such as a service center or the like) via the global positioning system of the vehicle and the telematics system of the vehicle.

In one form, the output of the control is provided to the driver as an audible message. In another form, the output of the control is provided to the driver as a visible display. The visible display may comprise a video display element, an alphanumeric or iconistic display element or the like, and may comprise a display on demand type display element, a thin film transistor liquid crystal display element, a multi-pixel display element, and/or a multi-icon display element and/or the like. In another form, a combination of a visible and audible output may be used.

Optionally, the system may include a seat adjustment system that is operable to adjust a seat of the vehicle in response to data received via at least one of the vehicle-based telematics system and the vehicle-based global positioning system. The seat adjustment system may be operable in response to biometric data pertaining to the occupant of the seat of the vehicle.

According to another aspect of the present invention, a method for providing navigational directions to a driver of a vehicle comprises accessing a remote source or service center via a vehicle-based wireless communication system and downloading local information from the remote source to a control of the vehicle via the wireless communication system in response to a user input. The local information comprises at least two driving instructions. Each of the at least two driving instructions is associated with or linked to a respective, particular geographic location. A current geographic position of the vehicle is provided to the control via a vehicle-based global positioning system. Each of the at least two driving instructions is provided by the control to the driver in response to the then current geographic position of the vehicle and only when the current geographic position of the vehicle at least generally matches or corresponds to the particular geographic location electronically associated with or linked to the respective one of the at least two driving instructions.

Preferably, the method includes associating or tagging or coding or linking (such as electronically, digitally or the like) each of the instructions with a respective particular geographic location. The control may tag or code the instructions to be associated with the respective geographic locations after the instructions have been downloaded, or the remote service center may tag or code the instructions to be associated with the respective geographic locations before downloading the instructions to the control, without affecting the scope of the present invention.

In one form, the at least two driving instructions are visibly displayed to the driver at a display of the vehicle. In another form, the at least two driving instructions are audibly communicated to the driver via at least one speaker of the vehicle. In a third form, a combination of a visible display and audible communication may be used.

According to yet another aspect of the present invention, a navigation system for a vehicle comprises a vehicle-based telematics system, a vehicle-based global positioning system, and a control. The telematics system is operable to receive a user input from a driver of the vehicle and to download directional information to the control of the vehicle in response to the user input and an initial geographic position of the vehicle. The directional information comprises at least two instructions. The control is operable to tag or code or link each of the instructions with a respective geographic location. The control is operable to provide an output corresponding to a particular instruction only when the geographic location tagged or coded or linked to the particular instruction at least generally corresponds to the actual current geographic position of the vehicle.

The present invention thus provides for step-by-step instructions or driving directions to the driver of a vehicle as the driver is driving the vehicle according to the instructions. Each step or instruction is provided either after the previous step or instruction has been completed or as the vehicle approaches a turn or intersection or location where the next step is to be performed, so that the driver is not overwhelmed with multiple instructions to remember as the driver drives the vehicle toward the targeted destination. The control or the remote source or service center is operable to electronically or digitally or otherwise tag, key, code or otherwise associate each instruction or step with a geographic location or waypoint, and the control is operable to only display that instruction when the geographic location tagged to the instruction generally matches the actual, current geographic position of the vehicle. All of the instructions are provided or downloaded to the vehicle during a single, short communication with the remote source or service center via the telematics system, so as to avoid multiple communications to the remote service center or a lengthy communication with the remote service center, thereby reducing the cost of the instruction service to the driver of the vehicle.

These and other objects, advantages, purposes, and features of the present invention will become more apparent from the study of the following description taken in conjunction with the drawings.

DESCRIPTION OF THE PREFERRED EMBODIMENTS

Figure 1:
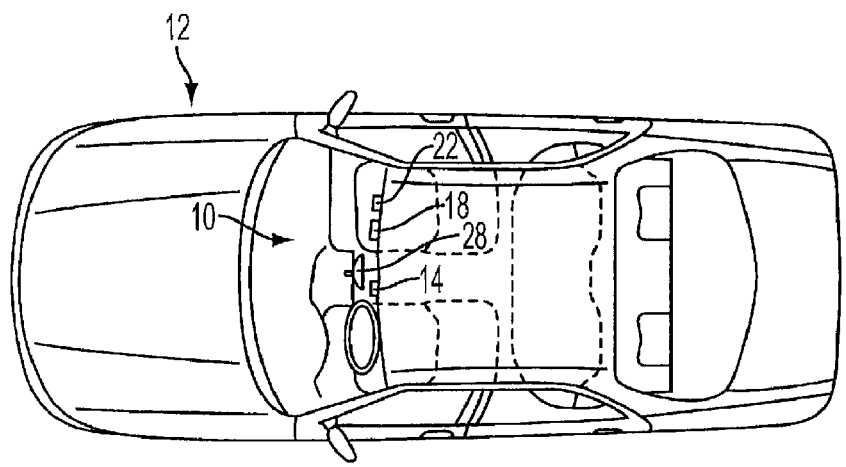
FIG. 1 is a top plan view of a vehicle incorporating a navigation system in accordance with the present invention.
Figure 2:
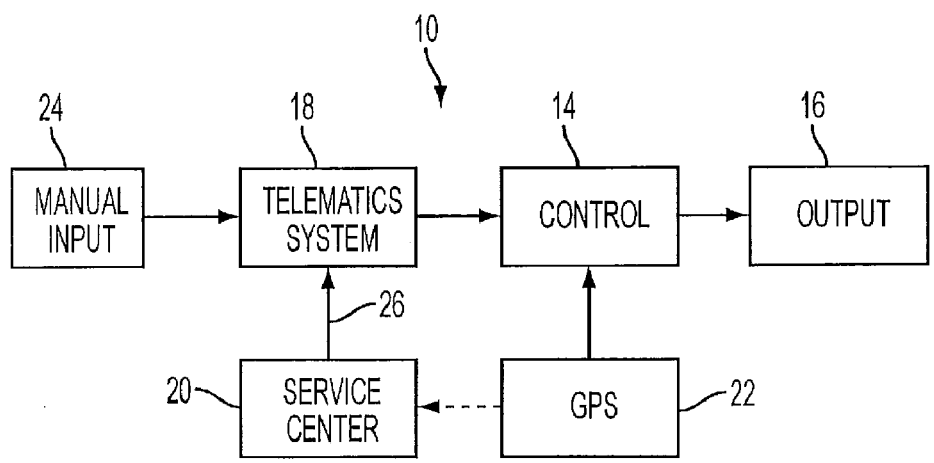
FIG. 2 is a block diagram of a navigation system in accordance with the present invention.

Referring now to the drawings and the illustrative embodiments depicted therein, a navigation system 10 of a vehicle 12 includes a control 14 which is operable to communicate an output 16, such as step-by-step directions or driving instructions, to a driver of the vehicle based on an initial, current or present geographic position of the vehicle and the desired or targeted final destination of the vehicle (FIGS. 1 and 2). The initial geographic position of the vehicle and the targeted destination is communicated to a remote source or service center 20 via a telematics system 18 of the vehicle and a global positioning system 22 of the vehicle. In response to a user input 24 from the driver or other occupant of the vehicle and the initial geographic position of the vehicle, the service center 20 provides or downloads a set of instructions or driving directions 26, which is received by the control 14 from the service center via the telematics system or wireless communication system 18 of the vehicle. Each of the particular instructions is electronically or digitally or otherwise coded, tagged, keyed, or otherwise associated with a respective particular geographic location or waypoint. The control 14 then provides the instructions or output 16 to the driver in a step-by-step manner based on the GPS-derived, actual, then current geographic position of the vehicle, and with the stepping from one step to the subsequent step of the instructions being linked to the then current geographic position of the vehicle in relation to the particular geographic locations or waypoints associated with the instructions, as discussed below.

The driver or the other occupant of the vehicle provides the user input 24 to the telematics system or wireless communication system 18 of the vehicle. The user input 24 may include a vocal communication or request for driving instructions or directional information to the final destination to an operator or voice input/recognition system of the service center or the like 20 associated with the telematics system 18 of the vehicle, or may be a keyed-in request or instructions via a keypad or the like to a remote computer system or computerized service center or the like, without affecting the scope of the present invention.

The driver or other occupant of the vehicle may provide (such as via a vocal communication or via a keypad input or the like) the initial position of the vehicle to the service center or the geographic position of the vehicle may be communicated to the service center via a global positioning system 22 of the vehicle.

The remote service center 20 is then operable to download the local map and/or the driving instructions or directions to a memory storage or control 14 of the vehicle while the communication link is open between the service center and the vehicle. Because only the local information necessary to direct the driver to the targeted destination is downloaded to the control or memory of the vehicle, the download may be completed in a relatively short period of time (thus minimizing the time and cost of the communication) and does not require a large amount of memory or storage space for the information. After the instructions or directions are downloaded to the vehicle, the driver may disconnect from the service center to avoid additional charges for the communication and service.

Each of the output instructions provided by the control is electronically or digitally or otherwise keyed or coded or tagged or otherwise associated with or linked to a respective or corresponding geographic location or waypoint. The instructions may be tagged or coded by the remote source or service center before the instructions are downloaded to the vehicle, or the instructions may be tagged or coded by the control at the vehicle after the instructions have been downloaded to the control, without affecting the scope of the present invention.

The control 14 also receives, preferably continuously, an input from the in-vehicle or vehicle-based global positioning system 22 which is indicative of the actual, current geographic position of the vehicle as it travels along the road, highway or the like. The control is then operable to compare the tagged or coded geographic locations as associated with the respective instructions with the GPS-derived actual geographic position information. Thus, the control is operable to determine when a particular instruction is appropriate to be displayed or communicated to the driver of the vehicle by determining that the actual GPS-derived geographic position of the vehicle is now at or at least close to the geographic location associated with a particular instruction. The control is then operable to provide the separate or particular output instructions to the driver of the vehicle in response to the actual, then current geographic position of the vehicle matching or corresponding to or approaching a particular geographic location or waypoint keyed to or coded to or tagged to or associated with a respective, particular instruction.

Preferably, the output or instructions are provided to the driver of the vehicle in a step-by-step manner, where each individual instruction or step is provided based on the then current geographic position of the vehicle with respect to the keyed or coded geographic location. More particularly, each particular instruction is provided to the driver by the control only when the actual geographic position of the vehicle at least generally corresponds to or matches the particular geographic location associated with or linked to the respective, particular instruction. The particular instruction is thus provided to the driver of the vehicle at the particular time at which the vehicle is positioned at or near a geographic location where the particular instruction is most useful to the driver of the vehicle.

For example, an initial instruction may be electronically or digitally coded to the initial geographic position of the vehicle when the directions/instructions are first requested (e.g., "You are heading East on First Street"). Each subsequent individual step may be provided in response to the control detecting or determining (in response to an output of the global positioning system) that the vehicle is approaching, at or near the next geographic location or waypoint, such as a turn, location, intersection or the like, at which the next step is to be performed (e.g., the car is approaching and within a predetermined or threshold distance from Main Street and the next instruction is "Turn Left on Main Street"), or in response to the control detecting or determining (again in response to the global positioning system of the vehicle) that a previous instruction or step has been completed (e.g., the car has turned left and is now traveling along Main Street and the next instruction is "Proceed North on Main Street"). The control is thus operable to provide the next step or instruction only when the driver can readily understand the instruction and focus on performing that particular step. The driver thus does not have to remember all of the multiple steps or turns or street names or exits or the like while also driving the vehicle. The driver also thus does not have to remain on the line with the remote service center operator and/or does not have to repeatedly contact the service center to obtain the instructions again if any of the instructions are forgotten, since the local instructions and/or map have been downloaded to the vehicle.

The telematics system or wireless communication system 18 of the vehicle may be operable to connect to a corresponding service center or operator or voice input/recognition system or the like 20 which may provide a variety of information or assistance to the driver of the vehicle in response to a vocal message from the driver or other occupant of the vehicle (although the user input may be a keypad input or the like to a computerized service center or the like, without affecting the scope of the present invention). Such a communication system and service center may be substantially similar to known systems and centers, such as General Motors' ONSTAR®, Daimler's TELEAID™, Ford's RESCU® or the like, which are common in vehicles today. The communication link may be accomplished utilizing various linking principles, such as the principles disclosed in commonly assigned U.S. Pat. Nos. 6,420,975, 6,278,377, 6,243,003, 6,329,925, 6,428,172, 6,326,613, the disclosures of which are hereby incorporated herein by reference.

The driver or occupant of the vehicle may actuate a communication link (such as via a push button or the like at the interior rearview mirror or at a console of the vehicle), and request from the operator, such as via a voice input, the driving instructions or directions as to how to get to a desired or targeted location or destination. The service center may receive the initial geographic position of the vehicle (such as in response to the global positioning system of the vehicle or from the driver), and may access a database to obtain the appropriate local map and/or local directions to the targeted destination. The operator may even access the vast data banks available at the service center for destinations or locations and may provide human interaction to help find the destination of choice if the driver does not know the exact address. The operator or service center then downloads the local information or step-by-step or turn-by-turn directions 26 to the control or memory or storage system 14 of the vehicle 12 in a single download. Optionally, it is envisioned that the service center may download or provide the information to the vehicle in real time (which may result in a longer opened communication link between the vehicle and the service center), without affecting the scope of the present invention.

The control 14 is operable to provide the downloaded instructions to the driver of the vehicle while the vehicle is driven by the driver toward the targeted destination. The control 14 provides the information or directions or output 16, such as when/where to turn, how far until the turn, and the direction to travel, to the driver as needed. The control may be operable to update the output display or message in real time based on the current geographic position of the vehicle as the vehicle travels along the given route.

The output or instructions may be provided to the driver by the control via an audible message or signal, such as via one or more speakers of the vehicle, such as by utilizing principles of audio systems of the types disclosed in commonly assigned U.S. Pat. Nos. 6,243,003; 6,278,377; and 6,420,975, which are hereby incorporated herein by reference, or may be provided via a display, such as in a display of an interior rearview mirror 28, such as a scrolling display of the type disclosed in commonly assigned U.S. patent application, Ser. No. 09/799,414, filed Mar. 5, 2001 by McCarthy et al. for COMPLETE MIRROR-BASED GLOBAL-POSITIONING SYSTEM (GPS) NAVIGATION SOLUTION, now U.S. Pat. No. 6,477,464, which is hereby incorporated herein by reference, or a display on demand type display, such as the types disclosed in commonly assigned U.S. Pat. Nos. 5,668,663 and 5,724,187, and U.S. patent applications, Ser. No. 10/054,633, filed Jan. 22, 2002 by Lynam et al. for VEHICULAR LIGHTING SYSTEM, now U.S. Pat. No. 7,195,381; and Ser. No. 09/793,002, filed Feb. 26, 2001, entitled VIDEO MIRROR SYSTEMS INCORPORATING AN ACCESSORY MODULE, now U.S. Pat. No. 6,690,268, the entire disclosures of which are hereby incorporated herein by reference, or in a display screen or the like at the interior rearview mirror assembly or elsewhere within the vehicle, without affecting the scope of the present invention. Other types of visible displays or locations for such visible displays may be utilized, such as at an accessory module or pod or windshield electronic module, an instrument panel of the vehicle, a console of the vehicle and/or the like, without affecting the scope of the present invention. The visible display may comprise written instructions, icons (such as left and right arrows or the like), or any other characters or symbols or indicia which convey to the driver of the vehicle when/where to turn and/or which direction to travel in order to arrive at the targeted destination. Optionally, the output may comprise a combination of a visible display and an audible message or signal, without affecting the scope of the present invention.

As indicated above, a variety of means may be utilized to visually convey the direction instructions to the driver of the vehicle. For example, and such as described in U.S. patent application, Ser. No. 09/799,414, filed Mar. 5, 2001 by McCarthy et al. for COMPLETE MIRROR-BASED GLOBAL-POSITIONING SYSTEM (GPS) NAVIGATION SOLUTION, now U.S. Pat. No. 6,477,464, which is hereby incorporated herein by reference, a text display may be provided and/or an iconistic display may be provided, such as a display readable through the interior rearview mirror reflective element itself. In this regard, use of a display on demand (DOD) type display (such as disclosed in commonly assigned, U.S. patent applications, Ser. No. 10/054,633, filed Jan. 22, 2002 by Lynam et al. for VEHICULAR LIGHTING SYSTEM, now U.S. Pat. No. 7,195,381, and Ser. No. 09/793,002, filed Feb. 26, 2001, entitled VIDEO MIRROR SYSTEMS INCORPORATING AN ACCESSORY MODULE, now U.S. Pat. No. 6,690,268, and in U.S. Pat. Nos. 5,668,663 and 5,724,187, the entire disclosures of which are hereby incorporated by reference herein), may be preferred. For example, a video display element or a video display screen or an information display element can be used (such as an elongated alphanumeric/multi-pixel/multi-icon display element and/or such as an LCD display or an emitting display element, such as a multi-pixel electroluminescent display or field emission display or light emitting diode display (organic or inorganic) or the like) which is disposed within the mirror housing of the interior mirror assembly of the vehicle, and located behind the mirror reflective element in the mirror housing, and configured so that the information displayed by the display element (that is positioned to the rear of the reflector of the mirror reflective element) is viewable by the driver through the mirror reflective element. Such a display can be accomplished by partially or wholly removing the reflector in the area of the display or, more preferably, by providing a display on demand type display, whereby the reflective element comprises a transflective element, as discussed below.

Preferably, and such as is disclosed in U.S. patent application Ser. No. 09/793,002, filed Feb. 26, 2001, entitled VIDEO MIRROR SYSTEMS INCORPORATING AN ACCESSORY MODULE, now U.S. Pat. No. 6,690,268, the video display screen or other visible display element or elements may be disposed behind the mirror reflective element so that the information displayed is visible by viewing through the mirror reflective element of the interior rearview mirror assembly, with the reflective element preferably comprising a transflective mirror reflector such that the mirror reflective element is significantly transmitting to visible light incident from its rear (i.e. the portion furthest from the driver in the vehicle), with at least about 15% transmission preferred, at least about 20% transmission more preferred, and at least about 25% transmission most preferred, while, simultaneously, the mirror reflective element is substantially reflective to visible light incident from its front (i.e. the position closest to the driver when the interior mirror assembly is mounted in the vehicle), with at least about 60% reflectance preferred, at least about 70% reflectance more preferred, and at least about 75% reflectance most preferred.

Preferably, a transflective electrochromic reflective mirror element is used (such as is disclosed in U.S. patent application, Ser. No. 09/793,002, filed Feb. 26, 2001, entitled VIDEO MIRROR SYSTEMS INCORPORATING AN ACCESSORY MODULE, now U.S. Pat. No. 6,690,268; and/or in U.S. Pat. Nos. 5,668,663 and 5,724,187, the entire disclosures of which are hereby incorporated by reference herein) that comprises an electrochromic medium sandwiched between two substrates. With the likes of a TFT LCD video display or a light emitting information display disposed behind the rear substrate of a third-surface transflective electrochromic mirror reflective element in a "display-on-demand" configuration (such as disclosed in U.S. patent applications, Ser. No. 10/054,633, filed Jan. 22, 2002 by Lynam et al. for VEHICULAR LIGHTING SYSTEM, now U.S. Pat. No. 7,195,381, and Ser. No. 09/793,002, filed Feb. 26, 2001, entitled VIDEO MIRROR SYSTEMS INCORPORATING AN ACCESSORY MODULE, now U.S. Pat. No. 6,690,268, which are hereby incorporated herein by reference), the presence of (and the image or information displayed by) the video display screen or information display is only principally visible to the driver (who views the display through the transflective mirror reflective element) when the information display element is powered so as to transmit light from the rear of the mirror reflective element through the transflective mirror reflector to reach the eyes of the driver. Preferably, a single high-intensity power LED, such as a white light emitting LED comprising a Luxeon™ Star Power LXHL-MW1A white light emitting LED having (at a 25 degree Celsius junction temperature) a minimum forward voltage of 2.55 volts, a typical forward voltage of 3.42 volts, a maximum forward voltage of 3.99 volts, a dynamic resistance of 1 ohm and a forward current of 350 milliamps, and as available from Lumileds Lighting LLC of San Jose, Calif., is used as a backlight for the TFT LCD video screen. Alternately, a plurality of such single high-intensity power LEDs (such as an array of two or of four such power LEDs) may be placed behind the TFT LCD video screen so that the intense white light projected from the individual single high-intensity power LEDs passes through the TFT LCD element and through the transflective electrochromic element, preferably producing a display intensity as viewed by the driver of at least about 200 candelas/sq. meter; more preferably at least about 300 candelas/sq. meter; and most preferably at least about 400 candelas/sq. meter. Alternately, cold cathode vacuum fluorescent sources/tubes can be used for backlighting and optionally can be used in conjunction with LED backlighting.

Optionally, and in accordance with incorporated U.S. patent application Ser. No. 09/793,002, now U.S. Pat. No. 6,690,268, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814, entitled "WIDE ANGLE IMAGING SYSTEM" to Bos of Donnelly Corporation, filed Jul. 27, 1999, now U.S. Pat. No. 6,201,642, and in U.S. patent application Ser. No. 09/199,907 entitled "WIDE ANGLE IMAGE CAPTURE SYSTEM FOR VEHICLE" to Bos et al. of Donnelly Corporation, filed Nov. 25, 1998, now U.S. Pat. No. 6,717,610, and in U.S. patent application Ser. No. 09/313,139 entitled "REARVIEW VISION SYSTEM WITH INDICIA OF BACKUP TRAVEL" to Schofield et al. of Donnelly Corporation, filed May 17, 1999, now U.S. Pat. No. 6,222,447; VEHICLE CAMERA DISPLAY", Ser. No. 09/776,625, filed Feb. 5, 2001, by Kenneth Schofield et al., now U.S. Pat. No. 6,611,202.

Note that other display locations are possible for display of the video image or information display, such as a map and/or a text message comprising driving instructions, to the driver or occupant of the vehicle. For example, a video image may be displayed on an LCD video screen of flip-down display (such as is disclosed in U.S. patent application Ser. No. 09/793,002, filed Feb. 26, 2001, entitled VIDEO MIRROR SYSTEMS INCORPORATING AN ACCESSORY MODULE, now U.S. Pat. No. 6,690,268, incorporated above), or on a video screen incorporated into the rearview mirror assembly, such as the type disclosed in U.S. provisional applications, Ser. No. 60/439,626, filed Jan. 13, 2003; Ser. No. 60/489,812, filed Jul. 24, 2003; and Ser. No. 60/492,225, filed Aug. 1, 2003, which are hereby incorporated herein by reference. Optionally, for example, a video display located in the front instrument panel can be used, or a video display located in an overhead console (such as an overhead accessory module or system as described in U.S. provisional applications, Ser. No. 60/489,812, filed Jul. 24, 2003; and Ser. No. 60/492,225, filed Aug. 1, 2003, which are hereby incorporated herein by reference) can be used, without affecting the scope of the present invention.

Alternately, as outlined above, a local area map may be downloaded to the control from the external service provider or service center and the control may be operable (such as by using the principles disclosed in U.S. patent applications, Ser. No. 10/054,633, filed Jan. 22, 2002 by Lynam et al. for VEHICULAR LIGHTING SYSTEM, now U.S. Pat. No. 7,195,381, and Ser. No. 09/793,002, filed Feb. 26, 2001, entitled VIDEO MIRROR SYSTEMS INCORPORATING AN ACCESSORY MODULE, now U.S. Pat. No. 6,690,268, which are hereby incorporated herein by reference) to feed such a map to the likes of a thin film transistor (TFT) liquid crystal (LC) video screen or other type of video screen or display element or display system, and with the instructions being conveyed by alphanumeric characters and/or indicia or the like and/or by highlighting portions of the map display. Such highlighting may be controlled by the in-vehicle control or control unit based on actual, current vehicle position information as determined by the in-vehicle or vehicle-based global positioning system. Thus, the vehicle owner need not buy into or have in the vehicle a full map of all areas to which the vehicle may be driven (such as regional maps or national maps or the like).

Alternately, a low cost, multi-pixel display (such as the type disclosed in U.S. provisional application, Ser. No. 60/373,932, filed Apr. 19, 2002 by McMahon for VEHICLE IMAGING SYSTEM, and in U.S. patent application Ser. No. 10/418,486, filed Apr. 18, 2003 by McMahon et al. for VEHICLE IMAGING SYSTEM, now U.S. Pat. No. 7,005,974, which are hereby incorporated herein by reference), such as a low cost multi-pixel vacuum fluorescent display, a low cost multi-pixel organic light emitting diode (OLED), a low cost multi-pixel field emission display, or any other or similar multi-pixel light emitting display or the like may be utilized, without affecting the scope of the present invention. The local area map, with the instructions iconistically displayed thereon, may be displayed on such a multi-pixel display or the like in response to the control receiving an input or download from the telematics system and/or the in-vehicle or vehicle-based global positioning system.

It is further envisioned that the control may provide a warning or alert to the driver of the vehicle when the actual geographic position of the vehicle (as provided by the global positioning system of the vehicle) is not where it should be based on the instructions received from the remote service center. For example, the control may instruct the driver to turn around or otherwise get back onto the given route, or the control may instruct the driver to contact the service center to obtain updated directions based on the new position of the vehicle. This may be done if, for example, the geographic position of the vehicle is outside of a predetermined or threshold range or distance of the next location or waypoint, or if the geographic position of the vehicle is past the location or waypoint. Optionally, the control may provide audible chirps or other audible signal or the like delivered by a speaker to alert the driver when approaching a turn or to indicate to the driver that the driver has missed a turn.

The control may also be operable to continuously monitor the actual geographic position of the vehicle and compare to the locations or waypoints associated with the instructions even after the vehicle has strayed from the given route. As discussed above, the control may provide instructions to turn around to get back on the given route. However, if the vehicle continues along a different path (such as in situations where the driver gets lost and attempts to find a way back to the given route, or where the driver may take an alternate route, such as an alternate route known to the driver or a detour or the like), but eventually arrives at one of the geographic locations or waypoints associated with the downloaded instructions, the control may be operable to recognize that the vehicle is back on the given route and resume communicating/displaying the appropriate instructions to the driver to direct the driver to the targeted destination.

During operation, as the driver is driving the vehicle, the driver may access or contact a service center via the telematics system 18 of the vehicle, such as ONSTAR®, TELEAID™, RESCU® or the like, depending on the type of vehicle, and request driving directions to a particular desired destination or targeted location. The operator or service center may provide the directions to the desired destination from the known position of the vehicle (which may be provided by the driver to the service center or may be known by the service center in response to the global positioning system of the vehicle). Preferably, the service center communicates the directions and downloads the directions to a storage location or control of the vehicle. The directions or instructions are electronically or digitally or otherwise coded or tagged or otherwise associated with or linked to a particular geographic location or waypoint either by the remote service center or by the control. The control is then operable to provide the directions in sections or parts or steps, with each separate, particular step or instruction being provided to the driver in response to the current geographic position of the vehicle (based on a signal from the global positioning system of the vehicle) generally corresponding to a particular geographic location or waypoint associated with the particular step or instruction. For example, a step may be provided in response to the vehicle completing a previous step of the directions, and/or may be provided in response to the vehicle approaching (such as the vehicle being within a threshold distance of) the street, intersection, location or the like at which the next step or turn is to be performed, without affecting the scope of the present invention.

Therefore, the present invention provides a navigation system which is operable to provide step-by-step instructions to a targeted destination to a driver of a vehicle while the driver is driving the vehicle toward the targeted destination. The instructions are downloaded from a remote database at a remote service center or the like via a telematics system or wireless communication system of the vehicle. The instructions may then be provided to the driver only as needed by the driver, since they are coded or associated with or linked to particular geographic locations or waypoints, thereby simplifying the instructions so that the driver will be able to understand each step and execute the step accordingly. The instructions may be downloaded to a storage or memory location or system of the vehicle during a brief communication or connection with the remote service center, so that the driver does not have to remain connected with the remote service center or repeatedly contact the service center to receive updated instructions as the driver drives the vehicle toward the targeted destination. The downloaded instructions are only the local instructions and thus do not require an excessive amount of time to download nor do they require an excessive amount of storage space or memory on the control. Thus, the remote service center, operator, computerized system or the like maintains the detailed maps and directories, and feeds back or downloads wirelessly to the vehicle the local information or map for communication or display to the driver of the vehicle for directional guidance information.

Optionally, the telematics system or communication link or other system may be operable to download data, such as via ONSTAR® or other communication system, or via a global positioning system or the like, to the vehicle or to a control or system or accessory of the vehicle. The data may be used to adjust an accessory or system of the vehicle or to set the accessory or system of the vehicle to a desired or appropriate setting in response to the data and/or in response to other vehicle or driver characteristics or status.

For example, data pertaining to the location of the vehicle, the time of day, the date, weather conditions and/or driving conditions may be provided to the vehicle for use in adjustment of an accessory or system of the vehicle. For example, such data may be used by a seat adjustment system, such that adjustment of the driver or passenger seat of the vehicle may be made in response to changes in such data. This may be beneficial because, for example, during long journeys, the seat adjustment or position at the start of the journey may not be comfortable or appropriate later on in the long journey. The seat adjustment system of the present invention thus may be operable to adjust the seat position or lumbar support or the like (and the mirror position or positions may also be adjusted accordingly) in response to various conditions, such as the length of the journey, altitude of the vehicle, driving conditions and/or the like. The seat adjustment system thus may make dynamic adjustments of the seat or seats to keep the driver or occupants of the vehicle comfortable or alert.

Optionally, it is envisioned that the seats of the vehicle may have a massage capability. In such applications, the seat adjustment system or seat control system may detect that the vehicle is on a long journey, and may activate the massage function to enhance the comfort to the driver of the vehicle. Such an adjustment or control may also be enabled if rural highway conditions are detected or other driving conditions where such a feature may be desired. It is further envisioned that the seat adjustment or control system may be programmable, such that a particular driver or occupant may indicate what changes he or she may desire in certain conditions. The seat adjustment system may then automatically activate such features or changes when the specified conditions are detected.

Optionally, the adjustment may also or otherwise be made in response to biometric data about the driver or occupant that is presently occupying the seat. It is known to use body measurements to order clothing tailored to the body measurements. Many catalogue clothing companies are now taking body scan measurements to order clothing on line. These measurements ensure a substantially perfect fit of the ordered clothing. Such body scan measurements or data or other such biometric data may be entered into the vehicle seat adjustment system, or may be communicated to the vehicle seat adjustment system, such as via the telematics system or other communication system or data system or the like. The seat adjustment system may then adjust the seat (and the mirrors may be adjusted as well) in response to detection of a particular person and/or their biometric characteristics or data.

Figure 3:
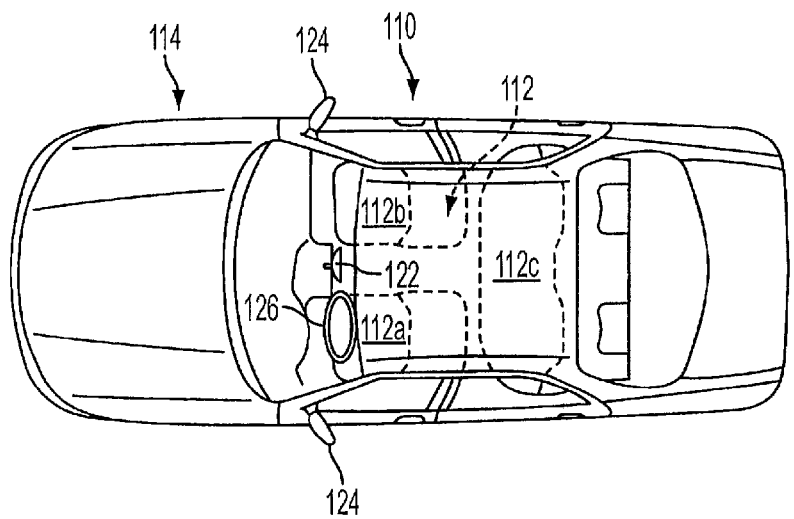
FIG. 3 is a top plan view of a vehicle incorporating a seat adjustment system in accordance with the present invention.
Figure 4:
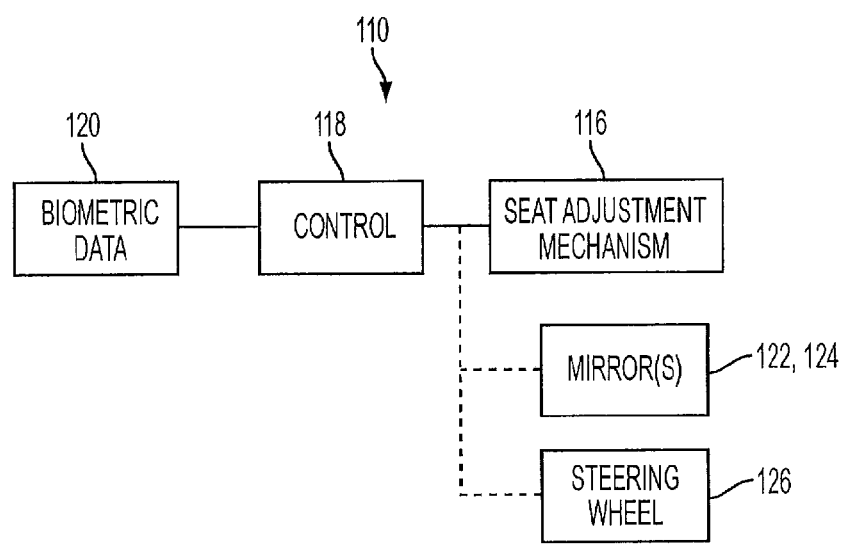
FIG. 4 is a block diagram of a seat adjustment system in accordance with the present invention.

Referring now FIGS. 3 and 4, a biometric seat adjustment system 110 is operable to adjust the seats 112 of a vehicle 114. The biometric seat adjustment system 110 may adjust a driver seat 112a, a front passenger seat 112b, and/or one or more rear passenger seats 112c via a powered seat adjustment mechanism 116 (FIG. 4) at the respective seats in response to biometric data or information pertaining to a person that may be sitting in or may be about to sit in one of the vehicle seats. As shown in FIG. 4, biometric seat adjustment system 110 includes a control 118, which may store biometric data 120 in a memory and/or may receive biometric data 120 from a remote source or an input device or communication (not shown). Control 118 is operable to control or adjust the seat adjustment mechanism 116 to adjust the seats 112 of the vehicle (such as lumbar support, seat travel, seat height, etc.) in response to the stored biometric data and/or input. For example, a person may have their biometric data or characteristics stored in a memory of control 118, and may select a particular code or setting corresponding to their data (such as "position 1" of the seat adjustment system), whereby control 118 adjusts the adjustment mechanism of the particular selected seat in response to the data. Alternately, a person may have their biometric data or characteristics stored in a portable device (such as a key fob, PDA, or the like) or at a remote location or device, and may have the biometric data or characteristic communicated to the control 118, whereby control 118 may adjust the adjustment mechanism of the particular selected seat in response to the communication. The control 118 may also be operable to control or adjust a setting of an interior rearview mirror 122, an exterior rearview mirror or mirrors 124, a steering wheel 126 and/or the like in response to the input or communication.

The present invention thus provides a vehicle seat adjustment in response to biometric data, such as various body dimensions, weight, sex, age and the like. Such body dimension measurements, such as those taken for ordering clothing, may be made on a person and may be contained in the person's computer or the like, along with other biometric data or characteristics of the person (and optionally may include preferences of the person). These data may be loaded into the vehicle computer and/or seat adjustment system. The seat adjustment system receives the data and may be operable to pre-adjust the driver seat (or passenger seat or other seat) of the vehicle in response to the data so that the seat that the person will sit in is set to the person's precise body measurements and other data. Additionally, the adjustment system may pre-adjust an interior rearview mirror, exterior rearview mirror or mirrors, steering wheel and/or the like in response to the measurements or inputs.

The body dimensions may be saved in a person's computer or PDA, such as done for ordering clothing. Such measurement and saving technology now exists and is used by some catalogues, such as Lands' End and/or Levi (which provides for measurements in their stores and these measurements are stored in the person's file for ordering perfect fit jeans). Alternately, a vehicle dealer may perform simple measurements on a person (like a tailor with a new suit). This information may then be used to adjust the seat in the person's vehicle to the person's body size, weight, age, sex, etc. For example, the vehicle dealer may download the information or data for a person or person's (such as a driver and their spouse) into memory positions 1 and 2 of a vehicle seat adjustment memory of the person's vehicle. Optionally, the data may be downloaded into a Bluetooth (or other communication protocol) enabled phone, PDA or key fob, which may then be used to communicate the data to the targeted vehicle. Such an approach would be particularly suitable for and advantageous to use with rental cars.

The biometric seat adjustment system preferably utilizes the normal memory seat adjustment system or mechanisms currently in some vehicles, such as high end vehicles. While the seats today can be adjusted to a person's particular preferences, it is likely that most people take awhile to get themselves comfortable. By using a few body dimensions and the person's weight (and maybe other information or characteristics as well), the present invention may set the seat or seats substantially perfectly before or when the person or persons first get into the vehicle.

It is envisioned that the biometric data measurement event may occur in the vehicle (such as by an in-vehicle laser or similar scanners and/or cameras that measure the driver's and/or passengers' biometric dimensions). Alternately, the biometric data may be measured external to the vehicle (such as at a dealership "booth" when the driver is ordering and/or receiving delivery of the vehicle or at a biometric measurement booth at a Mall or other store or facility or the like) and may be provided to the vehicle in a manner such as described above and/or via, for example, an ONSTAR® telematics service or via a similar telecommunication system or event or the like.

It is further envisioned that more than the seat or seats (lumbar support/seat travel/seat height etc.) may be adjusted in response to the individual biometric data stored in or communicated to the vehicle memory system. For example, exterior and/or interior mirror reflective elements may be moved or adjusted in response to such stored or input biometrics data, which may be called up or loaded when that particular individual sits in one of the seats of the vehicle. Additionally, other accessories or systems of the vehicle may be adjusted or customized, such as suspension characteristics; steering column tilt; size of display characters (for example, older drivers may desire larger alphanumerical display digits); and/or the like, in response to the biometric data of a particular individual.

Therefore, the present invention provides a navigation system which is operable to provide step-by-step instructions to a targeted destination to a driver of a vehicle while the driver is driving the vehicle toward the targeted destination. The instructions are downloaded from a remote database at a remote service center or the like via a telematics system or wireless communication system of the vehicle. The instructions may then be provided to the driver only as needed by the driver, since they are coded or associated with or linked to particular geographic locations or waypoints, thereby simplifying the instructions so that the driver will be able to understand each step and execute the step accordingly. The present invention may also provide a seat adjustment function that automatically adjusts the seat of the vehicle in response to data communicated to the vehicle via a telematics system or a global positioning system or the like. The seat adjustment system or function may be operable to adjust the seat of the vehicle in response to biometric data of the person occupying the seat. The interior and/or exterior rearview mirrors may also be adjusted in response to the data or seat adjustments.

Changes and modifications in the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A video mirror system for a vehicle, said video mirror system comprising:
   an interior electrochromic rearview mirror assembly mountable at an interior portion of a vehicle, said interior electrochromic rearview mirror assembly comprising a reflective element, said reflective element having a front portion that faces generally towards a driver of the vehicle when said interior rearview mirror assembly is mounted in the vehicle, and having a rear portion that is generally opposite said front portion;
   said reflective element comprising a transflective mirror reflector, said reflective element being at least about 15 percent transmitting to visible light incident at said rear portion of said reflective element, and at least about 60 percent reflective to visible light incident at said front portion of said reflective element, and said transflective mirror reflector of said reflective element comprising a third-surface transflective mirror reflector of said interior electrochromic rearview mirror assembly;
   a video display screen disposed to the rear of said rear portion of said reflective element, said video display screen emitting light when actuated that passes through said reflective element to be visible to a driver of the vehicle viewing said front portion of said reflective element;
   wherein said video display screen comprises a liquid crystal display element that is back lit by at least one of (i) a cold cathode vacuum fluorescent light source when said light source is powered and (ii) at least one white light emitting light emitting diode when said light emitting diode is powered;
   wherein said video display screen is operable to exhibit a display intensity as viewed by the driver viewing through said front portion of at least about 400 candelas per square meter when said interior electrochromic rearview mirror assembly is mounted, operated and viewed in the vehicle;
   wherein a camera having a field of view rearward of the vehicle is mounted to the rear of the vehicle and wherein, upon selecting a reverse gear, a video output of said camera is displayed by said video screen so as to assist the driver in reversing the vehicle; and
   wherein the presence of said video display screen is only principally visible to the driver of the vehicle, who is viewing said interior electrochromic rearview mirror assembly when it is mounted at said interior portion of a vehicle, when said liquid crystal display element is back lit.

2. The video mirror system of claim 1, wherein said liquid crystal display element is back lit by at least one of (i) at least one white light emitting high-intensity power light emitting diode, (ii) at least one white light emitting high-intensity power light emitting diode wherein said at least one white light emitting high-intensity power light emitting diode passes at least about 350 milliamps when operating at its operating voltage, (iii) a plurality of white light emitting light emitting diodes, and (iv) a plurality of white light emitting light emitting diodes comprising at least four white light emitting light emitting diodes.

3. The video mirror system of claim 1, wherein said video display screen comprises a thin film transistor liquid crystal display element, and wherein said liquid crystal display element is back lit by a plurality of white light emitting light emitting diodes and wherein said plurality of white light emitting light emitting diodes comprises at least four white light emitting light emitting diodes.

4. The video mirror system of claim 1 further comprising a vehicle-based control and a wireless communication between the vehicle and a remote location, said wireless communication being operable to download data useful to providing step-by-step driving instructions from a remote service provider to said vehicle-based control, and wherein step-by-step driving instructions are provided as at least one of (i) an audible message and (ii) a display displayed by said video display screen.

5. The video mirror system of claim 4, wherein a particular instruction is displayed in response to a global positioning system determining that an actual geographic position of the vehicle is at or close to a geographic location associated with the particular instruction, and wherein said particular instruction is not displayed before a global positioning system determines that the actual geographic position of the vehicle is at or close to the geographic location associated with said particular instruction, and said particular instruction is not displayed after a global positioning system determines that the actual geographic position of the vehicle is no longer at or close to the geographic location associated with the particular instruction.

6. The video mirror system of claim 1 further comprising a vehicle-based control and a wireless communication between the vehicle and a remote location and wherein said vehicle-based control receives a vocal input from the driver of the vehicle.

7. The video mirror system of claim 1, wherein said reflective element is at least about 20 percent transmitting to visible light incident at said rear portion of said reflective element.

8. The video mirror system of claim 1, wherein at least one of (a) a position of said reflective element is adjusted as a function of a biometric characteristic of the driver of the vehicle, (b) said video mirror system comprises a seat adjustment system operable to automatically adjust a seat of the vehicle in response to biometric data received via a data input, said biometric data pertaining to the occupant of the seat of the vehicle and said data input comprising at least one of (i) a memory device, (ii) a remote source, (iii) an input device, (iv) a communication link and (v) a portable device, and (c) said interior electrochromic rearview mirror assembly adjusts in response to biometric data received via a data input.

9. A video mirror system for a vehicle, said video mirror system comprising:
   an interior electrochromic rearview mirror assembly mountable at an interior portion of a vehicle, said interior rearview mirror assembly comprising a reflective element, said reflective element having a front portion that faces generally towards a driver of the vehicle when said interior rearview mirror assembly is mounted in the vehicle, and having a rear portion that is generally opposite said front portion;
   said reflective element comprising a transflective mirror reflector, said reflective element being at least about 15 percent transmitting to visible light incident at said rear portion of said reflective element, and said transflective mirror reflector of said reflective element comprising a third-surface transflective mirror reflector of said interior electrochromic rearview mirror assembly;
   a video display screen disposed to the rear of said rear portion of said reflective element, said video display screen emitting light when actuated that passes through said reflective element to be visible to a driver of the vehicle viewing said front portion of said reflective element;
   wherein said video display screen comprises a liquid crystal display element;
   wherein said video display screen is operable to exhibit a display intensity as viewed by the driver viewing through said front portion of at least about 400 candelas per square meter when said interior electrochromic rearview mirror assembly is mounted, operated and viewed in the vehicle;
   wherein said video display screen comprises a thin film transistor liquid crystal display element;
   wherein said liquid crystal display element is back lit by a plurality of white light emitting light emitting diodes and wherein said plurality of white light emitting light emitting diodes comprises at least four white light emitting light emitting diodes;
   wherein at least one of (a) a camera having a field of view rearward of the vehicle is mounted to the rear of the vehicle and wherein, upon selecting a reverse gear, a video output of said camera is displayed by said video screen so as to assist the driver in reversing the vehicle, and (b) said video screen displays navigation information; and
   wherein the presence of said video display screen is only principally visible to the driver of the vehicle, who is viewing said interior electrochromic rearview mirror assembly when it is mounted at said interior portion of a vehicle, when said liquid crystal display element is back lit.

10. The video mirror system of claim 9, wherein said video mirror system further comprises a user input disposed at said interior rearview mirror assembly for controlling a wireless communication system of the vehicle.

11. A video mirror system for a vehicle, said video mirror system comprising:
   an interior electrochromic rearview mirror assembly mountable at an interior portion of a vehicle, said interior rearview mirror assembly comprising a reflective element, said reflective element having a front portion that faces generally towards a driver of the vehicle when said interior rearview mirror assembly is mounted in the vehicle, and having a rear portion that is generally opposite said front portion;
   said reflective element comprising a transflective mirror reflector, said reflective element being at least about 15 percent transmitting to visible light incident at said rear portion of said reflective element, and at least about 60 percent reflective to visible light incident at said front portion of said reflective element;
   a video display screen disposed to the rear of said rear portion of said reflective element, said video display screen emitting light when actuated that passes through said reflective element to be visible to a driver of the vehicle viewing said front portion of said reflective element;
   wherein said video display screen comprises a back lit liquid crystal display element that is back lit by a plurality of white light emitting light emitting diodes;
   wherein said video display screen is operable to exhibit a display intensity as viewed by the driver viewing through said front portion of at least about 400 candelas per square meter when said interior electrochromic rearview mirror assembly is mounted, operated and viewed in the vehicle;
   wherein said reflective element comprises a third-surface transflective reflective element;
   wherein a camera having a field of view rearward of the vehicle is mounted to the rear of the vehicle and wherein, upon selecting a reverse gear, a video output of said camera is displayed by said video screen so as to assist the driver in reversing the vehicle; and
   wherein the presence of said video display screen is only principally visible to the driver of the vehicle, who is viewing said interior electrochromic rearview mirror assembly when it is mounted at said interior portion of a vehicle, when said liquid crystal display element is back lit.

12. A video mirror system for a vehicle, said video mirror system comprising:
   an interior electrochromic rearview mirror assembly mountable at an interior portion of a vehicle, said interior rearview mirror assembly comprising a reflective element, said reflective element having a front portion that faces generally towards a driver of the vehicle when said interior rearview mirror assembly is mounted in the vehicle, and having a rear portion that is generally opposite said front portion;
   said reflective element comprising a transflective mirror reflector, said reflective element being at least about 15 percent transmitting to visible light incident at said rear portion of said reflective element, and at least about 60 percent reflective to visible light incident at said front portion of said reflective element;

a video display screen disposed to the rear of said rear portion of said reflective element, said video display screen emitting light when actuated that passes through said reflective element to be visible to a driver of the vehicle viewing said front portion of said reflective element;

wherein said video display screen comprises a liquid crystal display element;

wherein said video display screen is operable to exhibit a display intensity as viewed by the driver viewing through said front portion of at least about 400 candelas per square meter when said interior electrochromic rearview mirror assembly is mounted, operated and viewed in the vehicle;

wherein said reflective element comprises a third-surface transflective reflective element;

wherein a camera having a field of view rearward of the vehicle is mounted to the rear of the vehicle and wherein, upon selecting a reverse gear, a video output of said camera is displayed by said video screen so as to assist the driver in reversing the vehicle;

wherein said liquid crystal display element is back lit by a plurality of white light emitting light emitting diodes; and wherein the presence of said video display screen is only principally visible to the driver of the vehicle, who is viewing said interior electrochromic rearview mirror assembly when it is mounted at said interior portion of a vehicle, when said liquid crystal display element is back lit.

13. A video mirror system for a vehicle, said video mirror system comprising:

an interior rearview mirror assembly mountable at an interior portion of a vehicle, said interior rearview mirror assembly comprising a reflective element, said reflective element having a front portion that faces generally towards a driver of the vehicle when said interior rearview mirror assembly is mounted in the vehicle, and having a rear portion that is generally opposite said front portion;

said reflective element comprising a transflective mirror reflector;

a video display screen disposed to the rear of said rear portion of said reflective element, said video display screen emitting light when actuated that passes through said reflective element to be visible to a driver of the vehicle viewing said front portion of said reflective element;

wherein said video display screen comprises a liquid crystal display element;

wherein said video display screen is operable to exhibit a display intensity as viewed by the driver viewing through said front portion of at least about 400 candelas per square meter when said interior rearview mirror assembly is mounted, operated and viewed in the vehicle;

wherein a camera having a field of view rearward of the vehicle is mounted to the rear of the vehicle and wherein, upon selecting a reverse gear, a video output of said camera is displayed by said video screen so as to assist the driver in reversing the vehicle;

wherein said liquid crystal display element is back lit by at least one of (i) at least one white light emitting high-intensity power light emitting diode and (ii) at least four white light emitting light emitting diodes; and wherein the presence of said video display screen is only principally visible to the driver of the vehicle, who is viewing said interior rearview mirror assembly when it is mounted at said interior portion of a vehicle, when said liquid crystal display element is back lit.

14. The video mirror system of claim 13, wherein said at least one white light emitting light emitting diode comprises a white light emitting high-intensity power light emitting diode that passes at least about 350 milliamps when operating at its operating voltage.

15. The video mirror system of claim 13, wherein said video display screen comprises a thin film transistor liquid crystal display element.

16. The video mirror system of claim 13 further comprising a vehicle-based control and a wireless communication between the vehicle and a remote location, said wireless communication being operable to download data useful to providing driving instructions from a remote service provider to said vehicle-based control, and wherein a particular instruction is displayed in response to a global positioning system determining that an actual geographic position of the vehicle is at or close to a geographic location associated with the particular instruction and wherein said particular instruction is not displayed before a global positioning system determines that the actual geographic position of the vehicle is at or close to the geographic location associated with said particular instruction, and said particular instruction is not displayed after a global positioning system determines that the actual geographic position of the vehicle is no longer at or close to the geographic location associated with the particular instruction.

17. The video mirror system of claim 13, wherein said reflective element is at least about 15 percent transmitting to visible light incident at said rear portion of said reflective element.

18. The video mirror system of claim 17, wherein said reflective element is at least about 60 percent reflective to visible light incident at said front portion of said reflective element.

19. The video mirror system of claim 17, wherein said reflective element is at least about 70 percent reflective to visible light incident at said front portion of said reflective element.

20. The video mirror system of claim 13, wherein said interior rearview mirror assembly comprises an interior electrochromic rearview mirror assembly, and wherein said reflective element comprises a third-surface transflective reflective element.

21. The video mirror system of claim 13, wherein said reflective element is at least about 15 percent transmitting to visible light incident at said rear portion of said reflective element, and wherein said video display screen comprises a thin film transistor liquid crystal display element, and wherein said interior rearview mirror assembly comprises an interior electrochromic rearview mirror assembly, and wherein said reflective element comprises a third-surface transflective reflective element, and wherein said liquid crystal display element is back lit by a plurality of white light emitting light emitting diodes and wherein said plurality of white light emitting light emitting diodes comprises at least four white light emitting light emitting diodes.

22. The video mirror system of claim 13, wherein said reflective element is at least about 15 percent transmitting to visible light incident at said rear portion of said reflective element, and wherein said video display screen comprises a thin film transistor liquid crystal display element, and wherein said interior rearview mirror assembly comprises an interior electrochromic rearview mirror assembly, and wherein said reflective element comprises a third-surface transflective reflective element, and wherein said liquid crystal display element is back lit by a plurality of white light emitting light emitting diodes, and wherein said video mirror system further comprises a user input disposed at said interior rearview mirror assembly for controlling a wireless communication system of the vehicle.

23. The video mirror system of claim 13, wherein said reflective element is at least about 15 percent transmitting to visible light incident at said rear portion of said reflective element, and wherein said video display screen comprises a thin film transistor liquid crystal display element, and wherein said interior rearview mirror assembly comprises an interior electrochromic rearview mirror assembly, and wherein said reflective element comprises a third-surface transflective reflective element, and wherein said liquid crystal display element is back lit by a plurality of white light emitting light emitting diodes, and wherein said video mirror system further comprises a user input disposed at said interior rearview mirror assembly for controlling a wireless communication system of the vehicle, and wherein said user input comprises a push button.

24. The video mirror system of claim 13, wherein said video mirror system further comprises a user input, said user input comprising at least one of (a) a push button and (b) a voice input device.

25. The video mirror system of claim 24, wherein said interior rearview mirror assembly comprises an interior electrochromic rearview mirror assembly, and wherein said reflective element comprises a third-surface transflective reflective element, and wherein said user input is included at said interior electrochromic rearview mirror assembly.

* * * * *